(12) United States Patent
Hessmer et al.

(10) Patent No.: US 7,779,089 B2
(45) Date of Patent: Aug. 17, 2010

(54) METHOD AND SYSTEM FOR REMOTE CONFIGURATION OF PROCESS DATA ACCESS SERVERS

(75) Inventors: Rainer Hessmer, Rancho Santa Margarita, CA (US); Ivan A. Todorov, Aliso Viejo, CA (US); Michael Hadrich, Munich (DE); Louis D. Ross, Corvallis, OR (US)

(73) Assignee: Invensys Systems, Inc., Foxboro, MA (US)

( * ) Notice: Subject to any disclaimer, the term of this patent is extended or adjusted under 35 U.S.C. 154(b) by 2201 days.

(21) Appl. No.: 09/954,422

(22) Filed: Sep. 14, 2001

(65) Prior Publication Data
US 2002/0112038 A1 Aug. 15, 2002

Related U.S. Application Data

(60) Provisional application No. 60/232,731, filed on Sep. 15, 2000.

(51) Int. Cl.
*G06F 15/177* (2006.01)
(52) U.S. Cl. .................................... 709/220; 709/203
(58) Field of Classification Search ................. 709/203, 709/220–222; 715/733–734, 736, 740–744; 706/909; 717/171, 176
See application file for complete search history.

(56) References Cited

U.S. PATENT DOCUMENTS

| | | | |
|---|---|---|---|
| 5,165,018 A * | 11/1992 | Simor | 709/222 |
| 5,491,791 A | 2/1996 | Glowny et al. | |
| 5,812,768 A | 9/1998 | Pagé et al. | |
| 5,872,966 A | 2/1999 | Burg | |
| 5,875,306 A * | 2/1999 | Bereiter | 709/220 |
| 5,887,171 A | 3/1999 | Tada et al. | |
| 5,987,633 A | 11/1999 | Newman et al. | |
| 6,041,347 A * | 3/2000 | Harsham et al. | 709/220 |

(Continued)

FOREIGN PATENT DOCUMENTS

| | | |
|---|---|---|
| EP | 0 791 880 A1 | 8/1997 |
| WO | PCT/US98/17622 A1 | 9/2000 |

OTHER PUBLICATIONS

International Search Report in corresponding PCT Application No. PCT/US01/28955, dated Dec. 6, 2001.

(Continued)

*Primary Examiner*—John Follansbee
*Assistant Examiner*—Saket K Daftuar
(74) *Attorney, Agent, or Firm*—Leydig, Voit & Mayer, Ltd.

(57) ABSTRACT

A remote configuration utility architecture is disclosed for a manufacturing/process control system data access server. Server agents, located on remote nodes, notify a configuration console of existing data access servers on the system. The configuration utility includes a control console from which a user selects one of the identified data access servers. Thereafter, the configuration console, via remote interfaces, obtains configuration parameters and associated rules associated with the selected data access server. The configuration utility thereafter displays the retrieved configuration information within a user interface faceplate defined for a type of configuration node selected for display/editing from the selected DAS. Using various faceplates for selected node types, the user creates, clears, examines and/or manipulates hierarchically arranged nodes for a configuration associated with the selected data access server.

20 Claims, 7 Drawing Sheets

U.S. PATENT DOCUMENTS

| | | | |
|---|---|---|---|
| 6,049,819 A | 4/2000 | Buckle et al. | |
| 6,091,811 A | 7/2000 | Chang et al. | |
| 6,154,778 A | 11/2000 | Koistinen et al. | |
| 6,192,364 B1 | 2/2001 | Baclawski | |
| 6,247,049 B1 * | 6/2001 | Scott | 709/222 |
| 6,247,128 B1 * | 6/2001 | Fisher et al. | 713/100 |
| 6,721,880 B1 * | 4/2004 | Pike | 713/1 |
| 6,959,332 B1 * | 10/2005 | Zavalkovsky et al. | 709/223 |

OTHER PUBLICATIONS

International Search Report in corresponding PCT Application No. PCT/US01/28951, dated Dec. 31, 2001.

International Search Report in corresponding PCT Application No. PCT/US01/28949, dated Dec. 14, 2001.

Supplementary European Search Report dated Jun. 25, 2009, for European Patent Application No. 01 97 3073.

* cited by examiner

METHOD AND SYSTEM FOR REMOTE CONFIGURATION OF PROCESS DATA ACCESS SERVERS

CROSS REFERENCE TO RELATED APPLICATION

This application claims priority of Todorov et al. U.S. provisional application Ser. No. 60/232,731 filed on Sep. 15, 2000, entitled "Remote Multiple Client Protocol Support," the contents of which are expressly incorporated herein by reference in their entirety including the contents and teachings of any references contained therein.

FIELD OF THE INVENTION

The present invention generally relates to the field of computerized process control networks. More particularly, the present invention relates to configuration utilities that access server components within manufacturing/process control networks to tailor the operation of the server components. An example of such a server component is a data access server system that supports access by supervisory level client applications to process control information.

BACKGROUND OF THE INVENTION

Significant advances in industrial process control technology have vastly improved all aspects of factory and plant operation. Before the introduction of today's modem industrial process control systems, industrial processes were operated/controlled by humans and rudimentary mechanical controls. As a consequence, the complexity and degree of control over a process was limited by the speed with which one or more people could ascertain a present status of various process state variables, compare the current status to a desired operating level, calculate a corrective action (if needed), and implement a change to a control point to affect a change to a state variable.

Improvements to process control technology have enabled vastly larger and more complex industrial processes to be controlled via programmed control processors. Control processors execute control programs that read process status variables, execute control algorithms based upon the status variable data and desired set point information to render output values for the control points in industrial processes. Such control processors and programs support a substantially self-running industrial process (once set points are established).

Notwithstanding the ability of industrial processes to operate under the control of programmed process controllers at previously established set points without intervention, supervisory control and monitoring of control processors and their associated processes is desirable. Such oversight is provided by both humans and higher-level control programs at an application/human interface layer of a multilevel process control network. Such oversight is generally desired to verify proper execution of the controlled process under the lower-level process controllers and to configure the set points of the controlled process.

Data access servers facilitate placing process control data within reach of a variety of higher-level monitoring/control client applications. During the course of operation, process controllers generate status and control information concerning associated processes. The controllers' process status and control information is stored within process control databases and/or distributed to a number of locations within the process control network. Other process information is generated/stored within field devices (e.g., intelligent transmitters) having digital data communication capabilities. The process information is retrieved from the databases and field devices by data servers for further processing/use by the process control system. For example, the data access servers provide the retrieved information to a variety of client applications providing high-level control and monitoring (both human and computerized) services.

In systems containing data access servers, high-level control and monitoring applications rely upon the proper configuration of the data access servers to provide information upon which such applications rely for decision-making. Such information includes real-time process variable values, alarms, etc. Manufacturing/process control systems are modified due to changes in the process control devices and the processes themselves. Many data access servers operate in complex process control computing environments in a time-critical manner. In very large systems, with hundreds, or even thousands, of data access servers spread across hundreds or thousands of computers in many buildings, the cost (in time and resources) of configuring the operation of running data access servers and the devices from which they receive their data grows exponentially with the number of such servers. The delay in completing tuning operations also increases. Such delays are costly to manufacturers. Therefore, manufacturers generally seek to minimize the delays encountered when tuning the operation of a data access server and its associated process control devices. Thus, it is important in such instances to provide a means for quickly configuring multiple data access servers and to minimize the time that the process stands idle.

Moreover, it is important to quickly remedy configuration faults in an industrial/manufacturing process managed by a process control system. A data access server that is malfunctioning or unable to function because of an improper configuration can result in significant downtime for a manufacturing process. In many applications, if the information or control pathway provided by a data access server is unavailable, whole production lines can be brought to a standstill.

SUMMARY OF THE INVENTION

The present invention comprises a new architecture and method for configuring data access servers from a remote location, thereby enabling a manufacturing/process control system administrator to configure multiple data access servers without having to physically go to each node on a network executing the data access servers. The present invention establishes a centralized utility which allows configuring a set of networked data access servers (DAS) from one location.

In accordance with the present invention, a distributed configuration architecture facilitates remote configuration of process control data access servers. A system embodying the present invention includes a control console from which a user operates a configuration editor. The configuration editor includes a user interface infrastructure. The configuration system also includes a configuration database that stores information describing specific configuration parameters for identified data access servers. The configuration system further includes a rules database for storing a set of configuration rules associated with data access servers that are configurable via the configuration system. The set of configuration rules guide the construction and/or editing of a configuration definition for a data access server. In a particular embodiment of the invention, the rules are specified for each node type.

In an embodiment of the present invention, remote connection to the configuration rules and parameters for a particular data access server is facilitated by a server agent that is executed upon remote nodes capable of running data access servers. The server agents include executable procedures for notifying the configuration editor of the existence of data access servers upon their respective nodes. An aspect of a particular embodiment of the present invention is the capability of the configuration system to support custom editor faceplates for each of the various types of configurable component (node) types supported within the configuration system.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

DETAILED DESCRIPTION OF AN ILLUSTRATIVE EMBODIMENT

The remote configuration utilities and complimentary interfaces incorporated into data access server systems incorporating the present invention enable users to configure a data access server from a single remote computer. An exemplary configuration utility architecture is disclosed for a data access server remote configuration carried out via an MMC (MICROSOFT Management Console) Snap-in. Through the remote configuration snap-in a user creates, clears, examines and/or manipulates a selected data access server configuration for any data access server within its local node or on any network-connected node.

Figure 1:
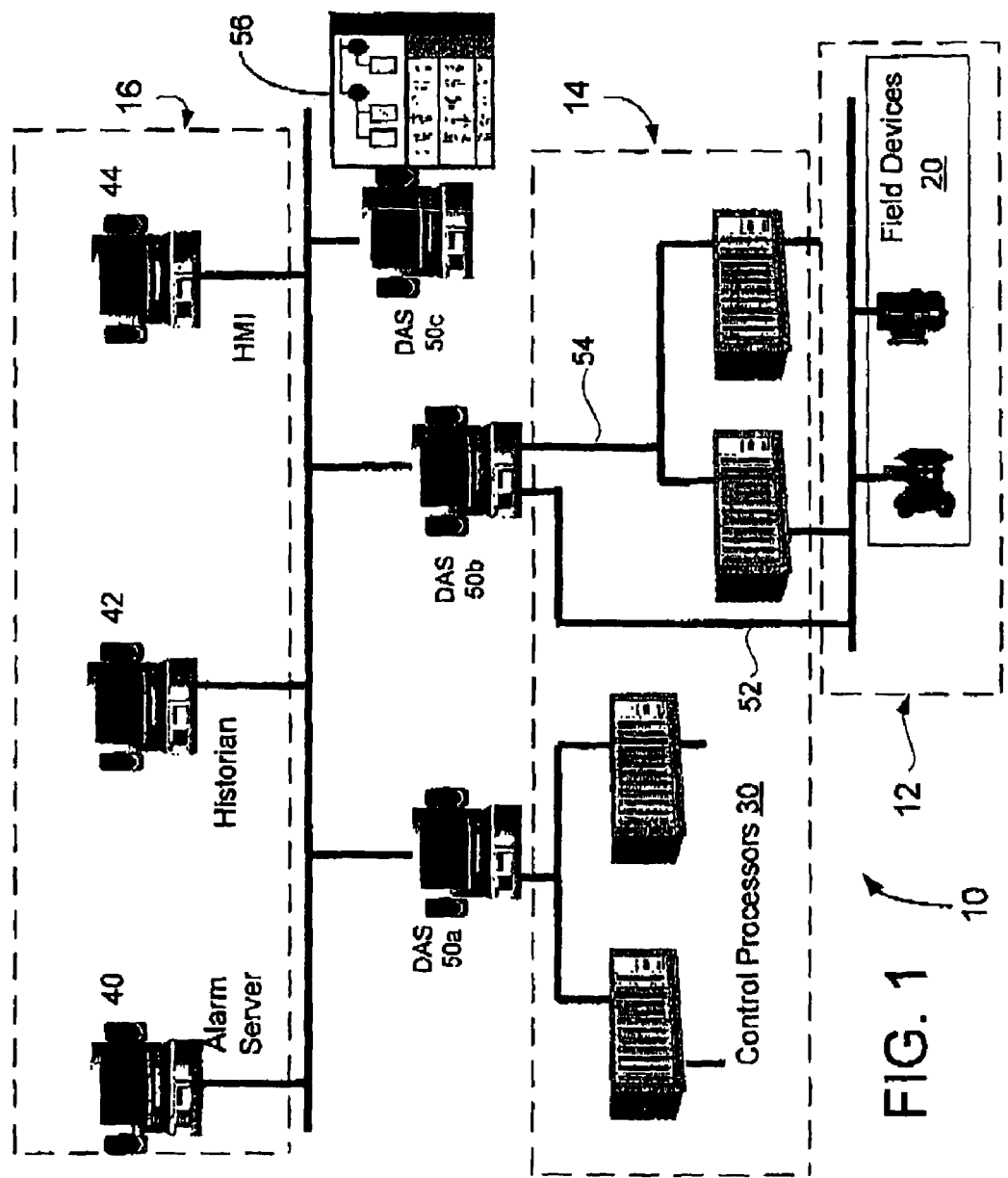
FIG. 1 is a schematic drawing depicting an exemplary process control environment for the present invention wherein a process data access server includes a remote configuration utility that retrieves configuration information within other data access servers that, in turn, retrieve/receive process control information and provide such information to a variety of client applications residing at a monitoring/supervisory layer of a process control network.

Turning initially to FIG. 1, an exemplary portion of a process control network 10 is illustratively depicted. As previously mentioned, the present invention is useful in any network including a data access server. However, the value of performing remote configuration on data access servers increases with increases in the number of data access servers and the distance between monitoring stations and data access servers within a manufacturing/process control network. The process control network 10 can be viewed as a set of devices connected to one or more network links associated with particular levels of the process control network 10. In the exemplary embodiment, the depicted portion of the process control network 10 includes a fieldbus level 12, a local control level 14, and a supervisory control level 16. Though the exemplary embodiment is depicted as having three levels, those skilled in the art will readily appreciate the applicability of the present invention to a number of process control network architectures having more, less, or the same number of network levels. The illustratively depicted network 10 embodies a multi-level bus topology. However, the present invention can be incorporated into process control networks embodying alternative network topologies (e.g., star networks, hybrid bus/star networks, etc.) including both single-level and hierarchical configurations.

In the exemplary portion of a process control network depicted in FIG. 1, a set of intelligent field devices 20 reside at the fieldbus level 12. The field devices include intelligent process variable transmitters that sense pressure, temperature, fluid flow, etc. in a controlled industrial process. The field devices also include actuators such as those enabling opening and closing fluid flow valves for tanks, burners, etc.

Control processors 30 at the local control level 14, perform local control functions with regard to the set of intelligent field devices 20. The control processors 30 receive process state information provided by the intelligent field devices 20. State information includes, for example pressure, temperature, mass flow, volumetric flow, etc. The control processors apply the received status information to a set desired points for the process, and then transmit control signals to actuators in order to obtain or maintain the desired set points. The control processors are programmed/configured to store the status and control information associated with their control function.

The supervisory control level 16 includes higher level control applications programs that facilitate and/or implement enterprise/plant level decision making and supervisory (e.g., set point) control value designation functions. An alarm server 40 receives process status data from a number of lower level sources, including both the control processors 30 and the field devices 20. The alarm server 40 compares the received status data against a set of alarm/event conditions and issues appropriate notifications to either monitors or control processes (e.g., control processors 30) in response to a detected alarm/event condition. The control processors 30 issue appropriate signals to controlled field devices/actuators to address the event/alarm condition. A historian 42, also operating at the supervisory control level 16, archives data received from any of the aforementioned levels of the process control system. Such data is available for auditing and verification by a variety of application programs. A human machine interface (HMI) 44 is yet another node connected to the supervisory control level 16. The human-machine interface 44 provides a set of graphic/text user interface functions enabling a human to view the operation/status of the controlled process associated with the process control system with which the depicted items of FIG. 1 are associated.

In an exemplary embodiment of the present invention, a set of data access server nodes 50a, 50b, 50c are interposed between the supervisory control level 16's processing nodes and the lower levels of the process control system (e.g., the local control level 14 and fieldbus level 12). The data access server node 50b, executing one or more logical DA servers, receives and/or extracts data from the field devices 20 (via channel 52) and/or the control processors 30 (via channel 54) and provides corresponding (possibly reformatted) data to processing nodes at the supervisory control level 16 of the process control network 10—including one or more of the nodes executing one of the other data access servers. The data access server nodes 50a-c perform the task of providing data to a variety of client applications that obtain data in accordance with particular data exchange protocols and are otherwise unable to access process control data provided at the local control level 14 and fieldbus level 12. A method and system for supporting multiple client data exchange protocols is described in Todorov et al. U.S. patent application Ser. No. 09/954,508 filed on Sep. 14, 2001, and entitled "An Industrial Process Control Data Access Server Supporting Multiple Client Data Exchange Protocols," which is incorporated herein by reference in its entirety including any references therein.

A configuration utility executed upon the data access server (DAS) 50c (indicated in FIG. 1 by window 56), any of the other data access servers, or any supervisory-level 16 node, provides a means for remotely configuring process control system data access servers. In an embodiment of the invention, the data access server configuration utility is an application that executes upon a same node as a data access server. For example, as depicted in FIG. 1, the configuration utility executes upon a data access server node 50c. However, there is no requirement for the configuration utility to reside upon any particular type of node (since it executes independently of DAS data acquisition/transmission processes). In the illustrative embodiment of the present invention, the configuration utility (tool), through DAS agents instantiated on at least nodes 50a and 50b (to query the registry on each of those nodes) discovers the data access servers running on DAS nodes 50a, 50b, and 50c and presents a list to a user. The DAS agents are a tool for discovering data access servers on a network. The user is then able to select one or more of the data access servers of interest to perform configuration. Once connections are established between the configuration utility running on DAS node 50c and the data access servers, other components within the data access servers take over and handle information requests from the configuration utility. Those components are discussed herein below with reference to FIG. 2. It is also noted that in an embodiment of the present invention, the configuration utility program is incorporated into a base library included within each of the data access server nodes 50a, 50b, and 50c, and thus there is no need on the part of an administrator to add any special programs or executable code to support the operation of the configuration utility within the network.

In the illustrative embodiment set forth in FIG. 1, a processing engine that carries out the core functionality of each DAS node 50a-c hosts the configuration utility and exposes a default set of configuration information via a set of well-defined interfaces described herein below with reference to FIGS. 4-6 As mentioned herein above, data access server node functionality can be enhanced, through customization of a server-specific part of the DA servers, by extending the scope of configurable features exposed by the data access servers to the configuration utility.

Furthermore, it is reiterated that the present invention is not limited to any particular process control system network topology or technology. For example, the disclosed exemplary process control network comprises a hierarchically arranged digital system. However, in an alternative network embodiment the present invention is incorporated within a monitoring node connected to a single-level process control network wherein the field devices, control processor(s), and supervisory control applications constitute nodes on a single bus. In yet other cases, the DAS receives data concerning conventional, analog field devices that utilize the 4-20 milliamp standard for process communications.

A number of features contribute to enhancing the configuration of data access servers from a remote location. First, the configuration utility incorporates a generic multi-tier architecture. The distinguishable tiers comprise an Interface, a Rule Interpretation, and a Configuration Persistence tier. Second, the configuration utility supports hot (on-line) configuration at the above-mentioned levels. Third, an arbitrary number of hierarchy levels can be defined. Fourth, the configuration utility supports performing remote configuration. Each of these features is discussed in more detail below.

Figure 2:
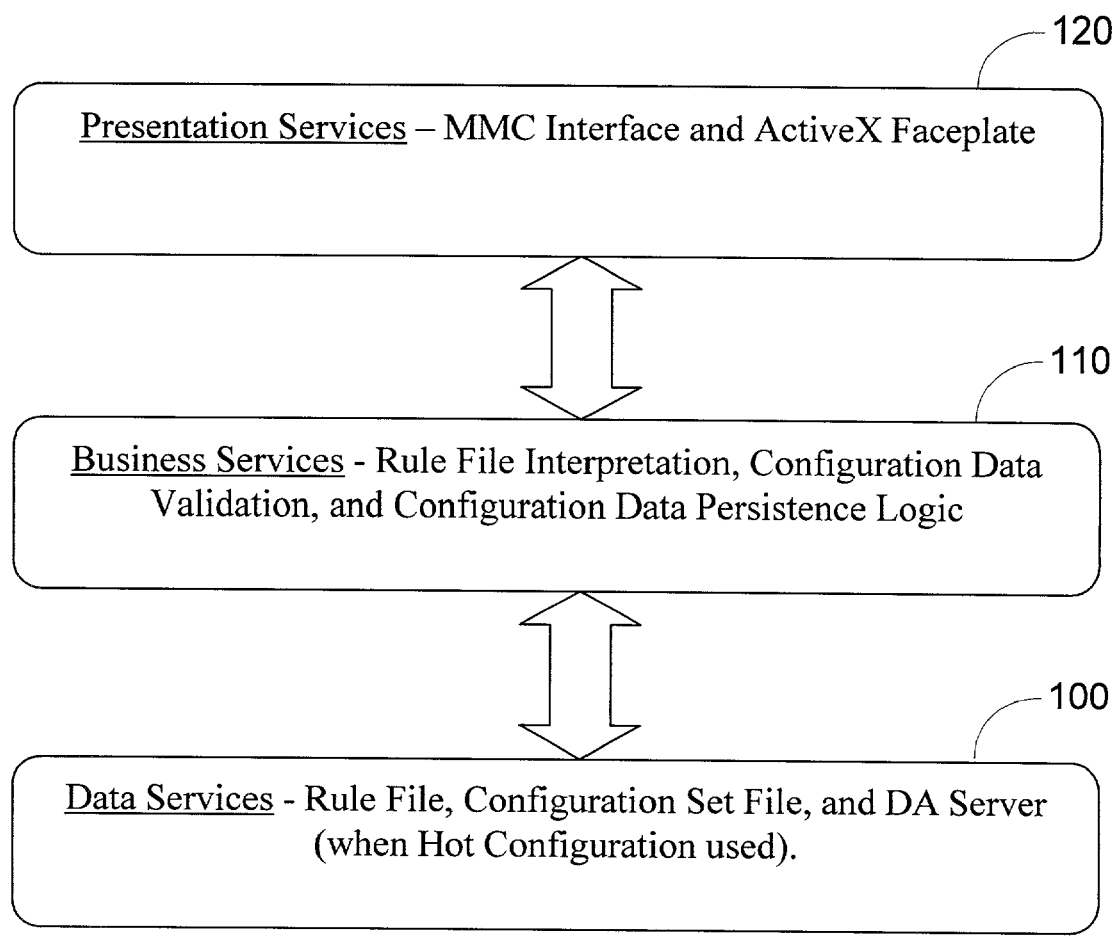
FIG. 2 depicts a multi-tiered software arrangement for carrying out remote configuration.

With reference to FIG. 2, the generic multi-tier software architecture of the configuration utility comprises a data services layer 100, a business services layer 110, and a presentation services layer 120. The tiers are implemented via a 'rules' file, carried out at the data services layer 100, that is associated with (specified for) each data access server. The data access server-specific rules files specify a set of configuration hierarchy levels and information about properties that are defined for configuration nodes at each hierarchy level. The information about properties includes: minimum/maximum number of child nodes allowed, names and types of child nodes allowed, default property values, minimum/maximum property values, and property names and types.

The "rules" file is implemented, by way of example, by a set of XML definitions. However, as those skilled in the art will readily appreciate, other languages/formats can be utilized to specify rules. The encapsulation of the rule file access within the bottom tier allows future modifications to this scheme without affecting any other layers of the configuration hierarchy. Also contained within the rules file are the GUIDs of the ActiveX faceplates that are activated for each hierarchy level.

The hierarchical organization supports a generic architecture allowing changes at one level to not affect other, unchanged, levels. The main configuration MMC snap-in at the Presentation Services tier 120 uses the Business Services tier 110 as a "rules interpreter/enforcer" that prevents a user from building an invalid hierarchy structure in a tree-view of the configuration. The Business Services tier 110 also ensures that data entered by a user is valid in view of rules specified by a particular data access server's rules file.

With regard to a second aspect of the disclosed remote configuration architecture, hot configuration refers to allowing a user to modify portions of a server's configuration and have those changes incorporated into the running and active server. The actual pushing of updated configuration parameters relies on an interface, specified by a server developer, that facilitates notifying a server of its configuration changes. A DAS Agent tracks currently active servers on a DAS node, and a user is allowed to make configuration modifications that are allowed for a current server state.

With regard to a third aspect of the disclosed remote configuration architecture, at any level within the hierarchy of a configuration tree (not to be confused with the program hierarchy depicted in FIG. 2), the 'Rules' file defines configuration nodes (leaves and/or branches) that can be added to the tree under the current node. Thus, configuration tree architecture is defined by a data access server developer, and there is no pre-defined hierarchy structure that would otherwise restrict such development.

With regard to a forth aspect of the disclosed remote configuration architecture, the MMC Snap-in that implements the configuration utility is executable on any network-accessible node in relation to a particular data access server (may be remote or local). Inter-node communications are carried out via DCOM. A DAS agent, installed on all server nodes, handles server locating/interfacing functions. Through DAS agents, the client (configuration utility) queries installed servers and/or currently running servers.

Figure 3:
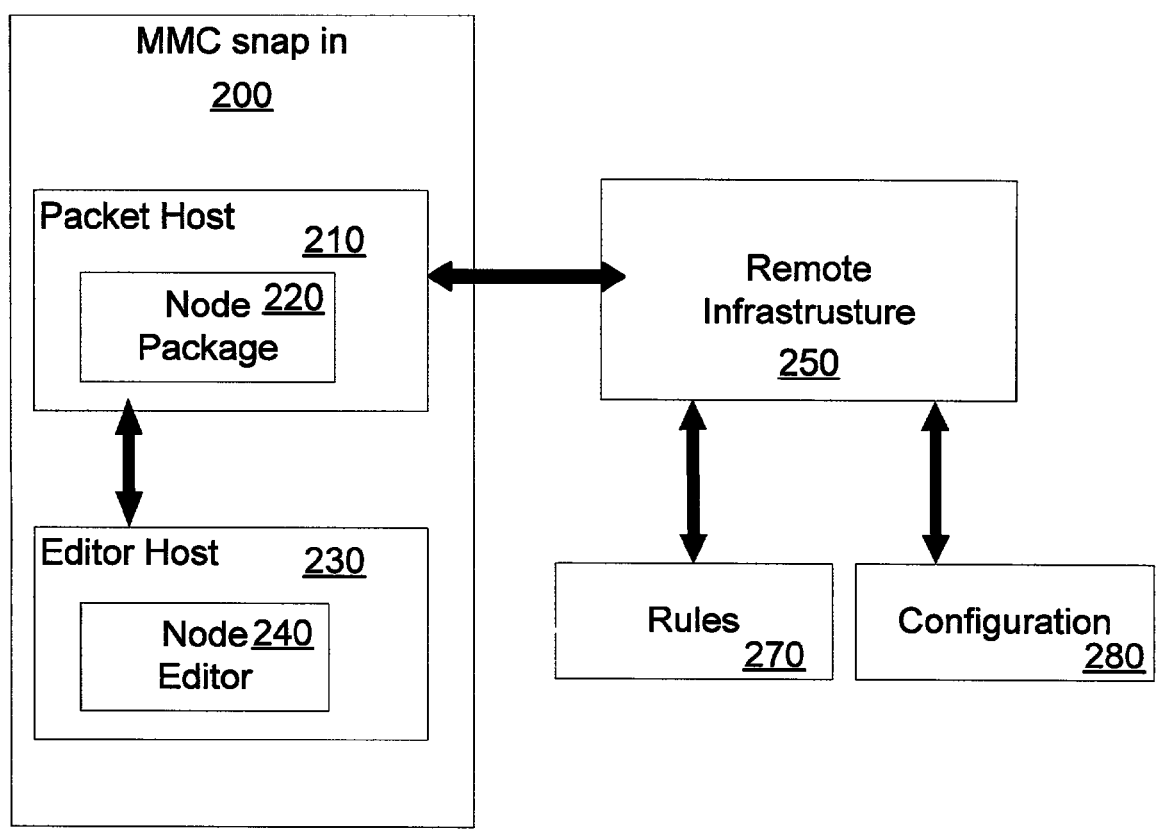
FIG. 3 is a schematic drawing identifying a set of components making up the client and server components of a remote configuration facility in accordance with an embodiment of the present invention.

Turning to FIG. 3, a configuration software component arrangement is schematically depicted for implementing remote configuration information extraction/manipulation via a configuration utility installed on the data access server node 50c. An MMC snap-in module 200, also referred to herein as the DAS control client (DASCC 200), is written according to the requirements of Microsoft MMC utility and constitutes the main executable module invoked by a user from the MMC of WINDOWS 98 (and later WINDOWS versions) Resource Toolkit. The MMC snap-in represents one of many potential ways to bundle the components of the configuration utility. A Package Host 210 is a module (DLL) that encapsulates the communication within the persistence area for remote configuration. The persistence area is a combination of a physical storage device and a logical organization of configuration/rules stored upon the physical storage device. For example, a persistence area can be a file with XML text stored upon a storage node. Alternatively, the persistence area is partially defined as a relational database on a storage node. The package host 210 fulfills the following tasks: (1) extracting available data from the persistence area and making it available for node editors, (2) validating and persisting the values provided by node editors into the persistence area, and (3) provide services t the DASCC relating to creating and deleting new/existing configuration hierarchy nodes. A node package 220 is a server-specific (i.e., user customized from toolkit template) module providing custom validation logic for the business services 110.

An editor host 230 module (DLL) is a generic host for all custom faceplates (Node Editors) that a user developer may create in support of custom configuration interfaces for editing particular node types. The editor host 230 provides a common GUI look and feel for all configuration hierarchies—such as for instance "Apply" the changes, "Restore" parameter values to the last persisted values, etc. A node editor 240, like the node package, is a custom faceplate specific to each node type supported in a DAS configuration utility. The node editor 240 is typically provided by a data access server developer and encapsulates the details of a particular node type configured on the editor host 230. In an embodiment of the invention, a library of node editors 240 (one per node type supported by the configuration system) is stored on the DAS control client 200's computer node. However, this is not a requirement, and indeed in alternative embodiments of the invention the node editor instances (derived from a generic Node Editor interface definition) are stored on a remote node containing, for example, the configuration and rule information for a particular DAS.

A remote infrastructure 250, stored upon each of the remote nodes containing an accessible DAS, comprises a set of modules facilitating remote configuration. The remote infrastructure 250 comprises, by way of example, two modules (and can be extended in case of future needs). The first, DASConfigAccess.dll, facilitates communicating with the storage/persistence area for purposes of accessing/storing the current configuration and rules for a selected data access server. This interface abstracts the configuration editor from the various manners in which the configuration parameters and rules are stored on a system. This allows the configuration editor to operate with a variety of storage area formats (e.g., files, databases, etc.) without modification. access methods associated with particular storage format and access methods. The second, DASAgent.exe, facilitates querying the nodes for installed/active DAS instances, and reports back to the user's remote configuration utility.

Rules 270 are a persistence area, typically specified by a user during remote configuration and then stored at the remote DAS node, containing a description of all hierarchy parameters and their relations/associations. In an embodiment of the present invention, XML listings are stored within a rules file, but alternative implementations are also contemplated such as a database. In an analogy to the C++ programming language, the Rule file corresponds to a class, while a configuration 280 corresponds to a set of instances of the "rule" defined class. The configuration 280 is a persistence area (exists after remote configuration by a user ends) component of remote configuration identifying/describing all configured hierarchy nodes and their associated parameters. Again, while XML is used in an exemplary embodiment, other embodiments of the invention specify the configuration in a different format/language (e.g., a database).

Figure 4:
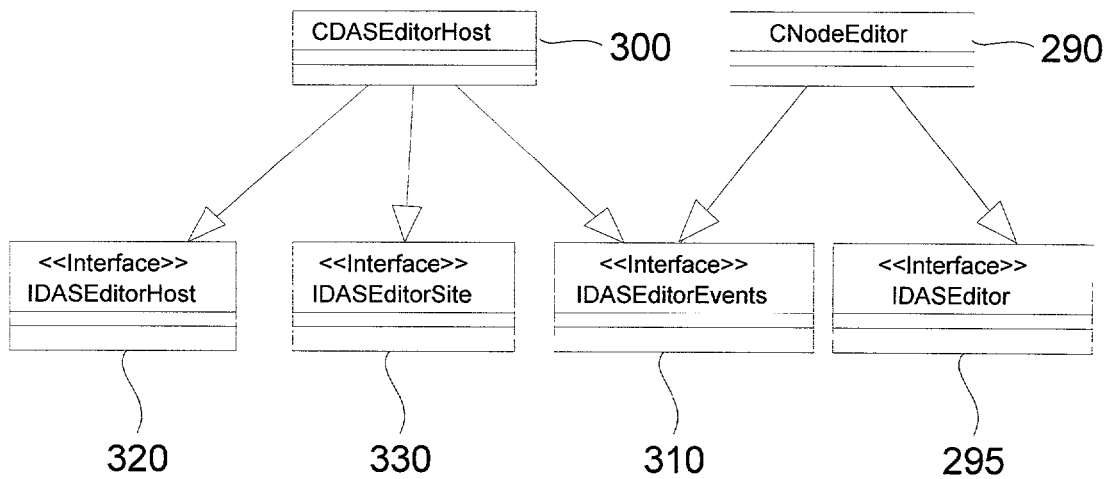
FIG. 4 depicts a set of interfaces supported by a data access server Package Host in accordance with an exemplary embodiment of the present invention.
Figure 5:
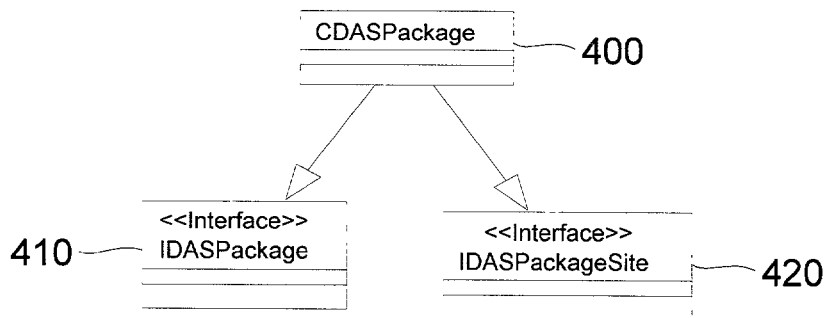
FIG. 5 depicts a set of interfaces supported by an Editor Host in accordance with an exemplary embodiment of the present invention.
Figure 6:
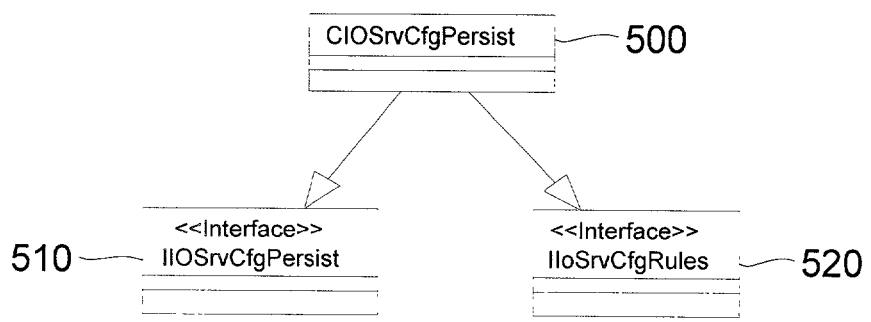
FIG. 6 depicts a set of interfaces supporting access to a remotely stored configuration database.

FIGS. 4, 5 and 6 comprise classes of objects associated with the remote configuration facility and the classes' associated interfaces. Turning FIG. 4, a set of interfaces are depicted that are implemented in a CNodeEditor class 290 from which a Node Editor 240 is instantiated. A CNodeEditor class object is created for each type of configuration node based upon the interfaces specified herein below. An IDASEditor interface 295 provides a mechanism for the Editor Host 230 to communicate with the Node Editor 240. An IDASEditorEvents 310 interface (described herein below with reference to an object class associated with the Editor Host 230) provides a mechanism for the Package Host 210 to notify a Node Editor 240 about context changes.

```
Declaration
[
    object,
    uuid (320C0A36-AB7C-11d4-93E4-00B0D0201D61),
    pointer_default (unique)
]
/*
IDASEditor is an interface implemented by each Node Editor. It allows the
Editor host to initialize the Node Editor and notify it about extenal events.
*/
interface IDASEditor : IUnknown
{
    HRESULT Initialize  (
                        [in] IDASPackageSite *pPackage,
                        [in] IDASEditorSite *pHostSite,
                        [in] BSTR bstrFullNodeName,
```

```
                    [in] BSTR bstrNodeName,
                    [in] BSTR bstrDelimeter,
                    [in] VARIANT_BOOL bIsReadOnly,
                    [in, unique] VARIANT* pVarAux);
    HRESULT Apply ( );
    HRESULT Restore ( );
    HRESULT Close ( );
}
Description
{vb}
Operations
Apply
    /*Notifies the Node Editor to persist (store) current data*/
Declaration
HRESULT Apply ( )
Return Value
    S_OK The status change was noted.
    E_FAIL Failure
Close
    /*Notifies the Node Editor that editor will be closed*/
Declaration
HRESULT Close ( )
Return Value
    S_OK CleanUp was succeeful.
    E_FAIL Failure
Initialize
    /*Initialize the Node Editor with parameters allowing it to communicate with
    DAS infrastructure*/
Declaration
    HRESULT Initialize   (
                    [in] IDASPackageSite *pPackage,
                    [in] IDASEditorSite *pHostSite
                    [in] BSTR bstrFullNodeName,
                    [in] BSTR bstrNodeName,
                    [in] BSTR bstrDelimeter,
                    [in] VARIANT_BOOL bIsReadOnly,
                    [in, unique] VARIANT* pVarAux)
Return Value
    S_OK The status change was noted.
    E_FAIL Failure
Restore
Declaration
HRESULT Restore ( )
    /*Instruct the Node Editor to restore the last persisted values*/
Return Value
    S_OK The status change was noted.
    E_FAIL Failure
```

With continued reference to FIG. 4, a set of interfaces are depicted that are implemented in a CDASEditorHost class 300 from which an Editor Host 230 is instantiated. One Editor Host object is instantiated for each DAS instance. An IDASEditorEvents 310 interface provides a mechanism for the Package Host 210 to notify an Editor Host 230 about context changes. The context changes include, for example: a change in the node name and a change in the parameters exposed by a particular Node Editor 240. IDASEditorEvents 310's operations are used to notify the Editor Host 230 and Node Editor 240 about events requiring action by these entities. In the case of the Editor Host 230, such calls are used, for example, by the Package Host 210.

```
Declaration
[
    object,
    uuid(320C0A33-AB7C-11d4-93E4-00B0D0201D61),
    pointer_default (unique)
]
interface IDASEditorEvents : IUnknown
{
    HRESULT OnNameChange
    (
    [in, string] BSTR bstrFullOldNodeName,
    [in, string] BSTR bstrOldNodeName,
    [in, string] BSTR bstrNewNodeName
    );
    HRESULT OnAtributeChange
    (
    [in, string] BSTR bstrFullNodeName,
    [in, string] BSTR bstrAttrName,
    [in] DWORD PropID,
    [in] VARIANT varNewValue
    );
}
Description
{vb}
OnAtributeChange
    /*Notifies the Node Editor about parameter changes */
Declaration
HRESULT OnAtributeChange
    (
    [in, string] BSTR bstrFullNodeName,
    [in, string] BSTR bstrAttrName,
    [in] DWORD PropID,
    [in] VARIANT varNewValue
    )
Parameters
    BstrFullNodeName    Specifies the full node name
    BstrAttrName        Specifies the attribute name
```

| | |
|---|---|
| PropID | Specifies the property ID |
| VarNewValue | New attribute Value |

Return Value
   S_OK Success
OnNameChange
   /*Notifies the Node Editor about node name changes*/
Declaration
HRESULT OnNameChange
   (
   [in, string] BSTR bstrFullOldNodeName,
   [in, string] BSTR bstrOldNodeName,
   [in, string] BSTR bstrNewNodeName
   )

Parameters
| | |
|---|---|
| bstrFullOldNodeName | Specifies the full old node name |
| BstrOldNodeName | Specifies the node name |
| BstrNewNodeName | Specifies the node name |

Return Value
   S_OK Success

An IDASEditorHost interface 320 is implemented by EditorHost components and provides common functionality between the individual Node Editors. For instance it host the custom Node Editors and handles events such as when the user seeks to persist the new configuration data or restore the last persisted configuration data.

```
Declaration
[
    object,
    uuid(320C0A34-AB7C-11d4-93E4-00B0D0201D61),
    pointer_default (unique)
]
interface IDASEditorHost : IUnknown
{
    HRESULT Initialize (
    [in] IDASPackageSite *PackageSite,
    [in] BSTR strEditorGuid,
    [in] BSTR strFullNodePath,
    [in] BSTR strNodeName,
    [in] BSTR strNodeType,
    [in] BSTR bstrDelimiter);
    HRESULT Close(
    [in] BOOL bForce);
    HRESULT IsDirty(
    [out] BOOL* dirty);
}
```
Operations
Close
      /*Notification that hosted Configuration Node Editor will be closed*/
Declaration
HRESULT Close (
   [in] BOOL bForce)
Parameters
   BForce   Flag specifying whether to Close and discard changes
               without prompting user to save changes or not:
               TRUE - discard changes (if any) and do not prompt user
               FALSE - prompt user if changes since last 'Apply'
Return Value
   S_OK Sucess.
Initialize
      /*Initialize that editor host with parameters allowing it to communicate with
      the storage area*/
Declaration
HRESULT Initialize (
   [in] IDASPackageSite *PackageSite,
   [in] BSTR strEditorGuid,
   [in] BSTR strFullNodePath,
   [in] BSTR strNodeName,
   [in] BSTR strNodeType,
   [in] BSTR bstrDelimiter)
Parameters

| | |
|---|---|
| PackageSite | Interface to the Storage area |
| strEditorGuid | GUID for the custom editor |
| strFullNodePath | This is fully qualified name of the parent. |
| strNodeName | Specifies the Node Name |
| strNodeType | Specifies is Node Type |
| bstrDelimiter | Specifies is Node Type |

Return Value
   S_OK Succees.
IsDirty
      /*Checks whether some of the parameters in the Node Editor were changed
(state 'dirty') since the last "Apply"*/
Declaration
HRESULT IsDirty(
   [out] BOOL* dirty)

```
Parameters
    Dirty   Flag indicating whether the editor is "dirty" (has changed attributes)
            TRUE - the attributes has been change
            FALSE - no change from the last save operation
Return Value
    S_OK Succees.
        An IDASEditorSite interface 330 provides a mechanism for the Node Editor 240 to
communicate to the Editor host 230.
Declaration
[
    object,
    uuid(F4136354-C2A0-47db-89F1-463ADEDFFDFF),
    pointer_default (unique)
]
interface IDASEditorSite : IUnknown
{
    HRESULT OnStatusChange ( );
}
Description
{vb}
Operations
OnStatusChange
Declaration
HRESULT OnStatusChange ( )
Return Value
    S_OK The status change was noted.
```

Referring to FIG. 5, a set of interfaces are depicted that are implemented in a CDASPackage class 400. An IDASPackage interface 410 provides the mechanism for a Node Editor 240 to access the storage area. The IDASPackage interface 410 also provides services to the DAS custom console (or DASCC). For instance when a user adds a new node to a configuration. The DASCC presents an indication of "available" nodes in view of rules specified for a particular stored node. For example, a user configures in the rule file a node of type "TCP." The TCP node can have up to 3 child nodes of type PLC and up to 5 PyramidIntegrator nodes. After the user adds 3 PLC nodes, the user will not be allowed to add more nodes of this type because the quota was exhausted. This test for configuration rule compliance is facilitated by the information provided by the PackageHost 210 to the DASCC 200. The Package Host 210 "compiles" the information from the rules and configuration and provide the results of the process to the DASCC 200 or Node Editors 240.

```
Declaration
[
    object,
    dual,
    uuid(320C0A37-AB7C-11d4-93E4-00B0D0201D61),
    pointer_default (unique)
]
/*
IDASPackage provides information to the DASCC about the current DAS
configuration and notifies the Package Host about user commands (like
add/delete a node for example )
*/
interface IDASPackage : IDispatch
{
    HRESULT Initialize(
    [in, string] BSTR bstrServerGUID,
    [in] IUnknown* pCfgRules
    );
    HRESULT GetChildren (
    [in, string] BSTR bstrFullNodeName,
    [in, string] BSTR bstrNodeDelimiter,
    [out] SAFEARRAY (BSTR) *bstrArrayChildrenNames,
    [out] SAFEARRAY (BSTR) *bstrArrayChildrenTypes,
    [out] SAFEARRAY (BSTR) *bstrArrayChildrenDelimiters
    );
    HRESULT GetPossibleChildTypes (
    [in, string] BSTR bstrFullNodeName,
    [out] SAFEARRAY (BSTR) *bstrChildTypes
    );
    HRESULT GetNodeProperties (
    [in, string ] BSTR bstrNodeType,
    [out] BSTR *strEditorGUID
    [out] BSTR *strDelimiter
    );
```

-continued

```
    HRESULT RenameNode (
        [in, string] BSTR bstrFullOldNodeName,
        [in, string] BSTR bstrOldNodeName,
        [in, string] BSTR bstrNewNodeName
    );
    HRESULT AddChild (
        [in, string] BSTR bstrFullNodeName,
        [in, string] BSTR bstrType,
        [in, string] BSTR bstrDelimiter
    );
    HRESULT DeleteChild (
        [in, string] BSTR bstrFullNodeName
    );
    HRESULT SelectionChange (
        [in, string] BSTR bstrFullNodeName,
        [in, string] BSTR bstrNodeType
    );
    HRESULT GetCfgSetFileName (
        [out]   BSTR *  pFileName
    );
    HRESULT SetCfgSetFileName (
        [in]    BSTR    bstrFileName
    );
    HRESULT EnumCfgSets (
        [out] SAFEARRAY (BSTR) *     pConfigSets
    );
    HRESULT SwitchToCfgSet (
        [in]    BSTR    bstrConfigset
    );
    HRESULT SaveCfgSetAs (
        [in]    BSTR    bstrConfigset
    );
    HRESULT Clearconfig (
    );
    HRESULT DeleteCfgset (
        [in]    BSTR    bstrConfigset
    );
}
```

Operations
AddChild
Declaration
HRESULT AddChild (
    [in, string] BSTR bstrFullNodeName,
    [in, string] BSTR bstrType,
    [in, string] BSTR bstrDelimiter
    )
Parameters
    bstrFullNodeName    Specifies fully qualified Node name
    BstrType    Specifies node type
    bstrDelimiter    Specifies the new Node Delimiter
Return Value
   S_OK Success
   E_FAIL Error
ClearConfig
Declaration
HRESULT Clearconfig (
    )
Return Value
   S_OK Success
   E_FAIL Error
DeleteCfgSet
Declaration
HRESULT DeleteCfgSet (
      [in]    BSTR    bstrConfigSet
    )
Parameters
    bstrConfigSet    Specify configation set name
Return Value
   S_OK Success
   E_FAIL Error
DeleteChild
Declaration
HRESULT DeleteChild (
    [in, string] BSTR    bstrFullNodeName
    )
Parameters
    bstrFullNodeName    Specifies fully qualified node name -continued

```
Return Value
    S_OK Success
    E_FAIL Error
EnumCfgSets
Declaration
HRESULT EnumCfgSets (
    [out]      SAFEARRAY (BSTR) *   pConfigSets
    )
Parameters
    pConfigSets    returns list wit configuration set (only names, no path)
GetCfgSetFileName
Declaration
HRESULT GetCfgSetFileName (
    [out]   BSTR *  pFileName
    )
Parameters
    pFileName    full name
GetChildren
Declaration
HRESULT GetChildren (
    [in, string] BSTR bstrFullNodeName,
    [in, string] BSTR bstrNodeDelimiter,
    [out] SAFEARRAY (BSTR) *bstrArrayChildrenNames
    [out] SAFEARRAY (BSTR) *bstrArrayChildrenTypes,
    [out] SAFEARRAY (BSTR) *bstrArrayChildrenDelimiters
    )
Parameters
    bstrFullNodeName           Specifies fully qualified node name
    bstrNodeDelimiter          Specifies fully qualified node name
    bstrArrayChildrenNames     Array with the names of the all children
    bstrArrayChildrenTypes     Array with the types for each children
    bstrArrayChildrenDelimiters  Array with the delimiters for each children
Return Value
    S_OK Success
    E_FAIL Error
GetNodeProperties
Declaration
HRESULT GetNodeProperties (
    [in, string ] BSTR bstrNodeType,
    [out] BSTR *strEditorGUID,
    [out] BSTR *strDelimiter
    )
Parameters
    bstrNodeType    Specifies node type
    StrEditorGUID   Returns the Editor GUID for the specified Node type
    strDelimiter    Returns Node delimiter
Return Value
    S_OK Success
    E_FAIL Error
GetPossibleChildTypes
Declaration
HRESULT GetPossibleChildTypes (
    [in, string] BSTR bstrFullNodeName,
    [out] SAFEARRAY (BSTR) *bstrChildTypes
    )
Parameters
    bstrFullNodeName   Specifies fully qualified node name
    bstrChildTypes     Returns a list with child types
Initialize
Declaration
HRESULT Initialize (
    [in, string] BSTR bstrServerGUID,
    [in] IUnknown* pCfgRules
    )
Parameters
    BstrServerGUID   Specifies Server Name (ProgID of the Server)
    PCfgRules        Interface to the IOAgent on the node where the Server resides
Return Value
    S_OK Success
    E_FAIL Error
RenameNode
Declaration
HRESULT RenameNode (
    [in, string] BSTR bstrFullOldNodeName,
    [in, string] BSTR bstrOldNodeName,
    [in, string] BSTR bstrNewNodeName
    )
```

-continued

```
Parameters
    bstrFullOldNodeName   Specifies the Full Old Node a Name
    bstrOldNodeName       Specifies the Full New name for a Node
    bstrNewNodeName       Specifies the Full New name for a Node
Return Value
    S_OK Success
    E_FAIL Error
SaveCfgSetAs
Declaration
HRESULT SaveCfgSetAs (
    [in]    BSTR    bstrConfigSet
    )
Parameters
    bstrConfigSet    Specify configation set name
Return Value
    S_OK Success
    E_FAIL Error
SelectionChange
Declaration
HRESULT SelectionChange (
    [in, string] BSTR bstrFullNodeName,
    [in, string] BSTR bstrNodeType
    )
Parameters
    BstrFullNodeName    Specifies fully qualified node name
    BstrNodeType        Specifies Node type
Return Value
    S_OK Success
    E_FAIL Error
SetCfgSetFileName
Declaration
HRESULT SetCfgSetFileName (
    [in]    BSTR    bstrFileName
    )
SwitchToCfgSet
Declaration
HRESULT SwitchToCfgSet (
    [in]    BSTR    bstrConfigSet
    )
```

An IDASPackageSite interface 420 supports a connection between Node Editors 240 and the values for their parameters. This interface does not communicate directly with the storage area. In the illustrative embodiment there is one more level of indirection between the storage area and the PackageHost 210 (that implements IDASPackageSite). This level of indirection is provided via a DASConfigAccess.dll that implements IIOSrvCfgPersist and IioSrvCfgRules interfaces in the Remote Infrastructure 250.

```
Declaration
[
    object,
    uuid(320C0A39-AR7C-11d4-93E4-00B0D0201D61),
    pointer_default (unique)
]
interface IDASPackageSite : IUnknown
{
    HRESULT GetAttribute
    (
        [in] DWORD attributeHandle,
        [in] DWORD PropID,
        [out, retval] VARIANT *pVarValue
    );
    HRESULT SetAttribute
    (
        [in] DWORD attributeHandle,
        [in] DWORD PropID,
        [in] VARIANT varValue,
        [out, retval] VARIANT_BOOL* pbSuccessFlag
    );
    HRESULT GetAttrHandle
    (
        [in, string]    BSTR    attParent,
        [in, string]    BSTR    attName,
        [out, retval]   DWORD*  pAttributeHandle
    );
```

```
        HRESULT CloseAttrHandle
        (
            [in] DWORD attributeHandle
        );
        HRESULT GetPackageShapeInfo
        (
            [in, string] BSTR bstrFullNodeName,
            [in] SHORT nSelection,
            [out] SAFEARRAY (BSTR)* bstrAttrNames
        );
        HRESULT Commit
        (
            BSTR bstrFullNodeName,
            BSTR bstrType,
            BSTR bstrDelimiter,
            SHORT *CommitStatus
        );
}
```
Description
{vb}
Operations
CloseAttrHandle
Declaration
HRESULT CloseAttrHandle
```
    (
        [in] DWORD attributeHandle
    )
```
Parameters
    attributeHandle   Handle of the attribute, retrieved from Shape Data Collection.
Return Value
    S_OK ShapeInfo was successfully retrieved.
Commit
Declaration
HRESULT Commit
```
    (
        BSTR bstrFullNodeName,
        BSTR bstrType,
        BSTR bstrDelimiter,
        SHORT *CommitStatus
    )
```
Parameters

| | |
|---|---|
| bstrFullNodeName | Full Node name |
| bstrType | Node type |
| bstrDelimiter | Node Delimiters |
| CommitStatus | Indicates the status of the Commit. Following values are defined COMMIT_OK - Changes are saved COMMIT_INVALID_HANDLE - invalid handle specified COMMIT_FAIL - The changes are not saved due to problems with the overall integrity of the node attributes COMMIT_REMOTE_FAIL - Remote method call has failed |

Return Value
    S_OK new values were successfully set
    E_FAIL Fail to save the change
GetAttrHandle
Declaration
HRESULT GetAttrHandle
```
    (
        [in, string]    BSTR      attParent,
        [in, string]    BSTR      attName,
        [out, retval]   DWORD*    pAttributeHandle
    )
```
Parameters

| | |
|---|---|
| attParent | The parent of the attribute. |
| attName | The parent of the attribute. |
| pAttributeHandle | The returned handle of the attribute. Can be used in Get/Set Attribute calls. |

Return Value
    S_OK Successfully set the value of the property.
Remarks
    The GetAttrHandle operation gets the attribute handle that can then be used for Get/Set Attribute calls. The GetAttrHandle operation does not resolve array or property references. If these are needed, the client should update the appropriate MxAttributeHandle fields directly before issuing a Get or Set call.
GetAttribute
Declaration -continued

```
HRESULT GetAttribute
    (
        [in] DWORD attributeHandle,
        [in] DWORD PropID,
        [out, retval] VARIANT *pVarValue
    )
Parameters
    attributeHandle    Handle of the attribute, retrieved from Shape Data Collection.
    PropID             Requested Property ID
    pVarValue          Receives the Value of the attribute/property.
Return Value
    S_OK Successfully retrieved the value.
Remarks
Used to get the attribute values of a primitives.
GetPackageShapeInfo
Declaration
HRESULT GetPackageShapeinfo
    (
        [in, string] BSTR bstrFullNodeName,
        [in] SHORT nSelection,
        [out] SAFEARRAY (BSTR)* bstrAttrNames
    )
Parameters
    BstrFullNodeName   Full Node Name
    NSelection         Specifies the type of array to return For all allowed
                       values please refer to enumerator
                       SHAPE_INFO_ENUM
    BstrAttrNames      BSTR Safe array pointer. This array will be filled
                       with reqested shape information for specifique
                       node
Return Value
    S_OK ShapeInfo was successfully retrieved.
SetAttribute
Declaration
HRESULT SetAttribute
    (
        [in] DWORD attributeHandle,
        [in] DWORD PropID,
        [in] VARIANT varValue,
        [out, retval] VARIANT_BOOL* pbSuccessFlag
    )
Parameters
    AttributeHandle    Handle of the attribute, retrieved from Shape Data Collection.
    PropID             Requested Property ID
    VarValue           Value of the property.
    pbSuccessFlag      Signifies whether set was accepted.
Return Value
    S_OK Successfully set the value of the property.
Remarks
Used to set the attribute values of a primitive.
```

Referring to FIG. 6, a set of interfaces are depicted that are implemented in a CIOSrvCfgpersist class 500. An IIOSrCfgpersist interface 510 defines a set of methods for reading a current configuration for editing or saving a new configuration in the configuration

```
Declaration
[
        object,
        dual,
        uuid(52088D9A-DED4-11D3-83F2-00A024A866AC),
        helpstring ("IIOSrvCfgPersist Interface"),
        pointer_default (unique)
]
/*
        IIOSrvCfgPersist provides a way to persis the current configuration into
the storage area and retreive this information later
*/
    interface IIOSrvCfgPersist : IDispatch
```

-continued

```
{
HRESULT GetCfgFileName (
    [in]                    BSTR        ServerClsIdString,
    [out]                   BSTR   *    pFileName
    );
HRESULT SetCfgFileName (
    [in]                    BSTR        ServerClsIdString,
    [in]                    BSTR        FileName
    );
HRESULT EnumCfgSets (
    [in]                    BSTR        ServerClsIdString,
    [out]           SAFEARRAY (BSTR) *  pConfigSets
    );
HRESULT SwitchToCfgSet (
    [in]                    BSTR        ServerClsIdString,
    [in]                    BSTR        pConfigSet
    );
HRESULT SaveCfgSetAs (
    [in]                    BSTR        ServerClsIdString,
    [in]                    BSTR        pConfigSet
    );
HRESULT ClearCfgFile (
    [in]                    BSTR        ServerClsIdString
    );
HRESULT DeleteCfgFile (
    [in]                    BSTR        bstrServerClsIdString,
    [in]                    BSTR        bstrConfigurationSet
    );
HRESULT SetHierarchyObject (
    [in]                    BSTR        ServerClsIdString,
    [in]                    BSTR        Name,
    [in]                    BSTR        Type,
    [in]                    BSTR        Delimiter,
    [in, unique]    SAFEARRAY (BSTR) *  pProperties
    );
HRESULT GetHierarchyObject (
    [in]                    BSTR        ServerClsIdString,
    [in]                    BSTR        Name,
    [out]                   BSTR   *    pType,
    [out]                   BSTR   *    pDelimiter,
    [out]           SAFEARRAY (BSTR) *  pProperties
    );
HRESULT RemoveHierarchyObject (
    [in]                    BSTR        ServerClsIdString,
    [in]                    BSTR        Name
    );
HRESULT RenameHierarchyObject (
    [in]                    BSTR        ServerClsIdString,
    [in]                    BSTR        OldName,
    [in]                    BSTR        NewName);
HRESULT SetTopicObject (
    [in]                    BSTR        ServerClsIdString,
    [in]                    BSTR        Name,
    [in]                    BSTR        Parent,
    [in]                    BSTR        Type,
    [in]                    LONG        UpdateInterval,
    [in, unique]    SAFEARRAY (BSTR) *  pProperties
    );
HRESULT GetTopicObject (
    [in]                    BSTR        ServerClsIdString,
    [in]                    BSTR        Name,
    [in]                    BSTR        Parent,
    [out]                   BSTR   *    pType,
    [out]                   LONG   *    pUpdateInterval,
    [out]           SAFEARRAY (BSTR) *  pProperties
    );
HRESULT RemoveTopicObject (
    [in]                    BSTR        ServerClsIdString,
    [in]                    BSTR        Name,
    [in]                    BSTR        Parent);
HRESULT RenameTopicObject (
    [in]                    BSTR        ServerClsIdString,
    [in]                    BSTR        OldName,
    [in]                    BSTR        Parent,
    [in]                    BSTR        NewName);
HRESULT SetLeafObject (
    [in]                    BSTR        ServerClsIdString,
    [in]                    BSTR        Name,
    [in]                    BSTR        Parent,
```

-continued

```
        [in]                    BSTR          Type,
        [in]                    BSTR          Delimiter,
        [in, unique]  SAFEARRAY (BSTR) *      pProperties
        );
    HRESULT GetLeafObject (
        [in]                    BSTR          ServerClsIdString,
        [in]                    BSTR          Name,
        [in]                    BSTR          Parent,
        [out]                   BSTR *        pType,
        [out]                   BSTR *        pDelimiter,
        [out]         SAFEARRAY (BSTR) *      pProperties
        );
    HRESULT RemoveLeafObject (
        [in]                    BSTR          ServerClsIdString,
        [in]                    BSTR          Name,
        [in]                    BSTR          Parent);
    HRESULT RenameLeafObject (
        [in]                    BSTR          ServerClsIdString,
        [in]                    BSTR          OldName,
        [in]                    BSTR          Parent,
        [in]                    BSTR          NewName);
    HRESULT BrowseHierarchyObjects (
        [in]                    BSTR          ServerClsIdString,
        [in]                    BSTR          BranchName,
        [out]         SAFEARRAY (BSTR) *      pBranches,
        [out]         SAFEARRAY (BSTR) *      pLeaves,
        [out]         SAFEARRAY (BSTR) *      pTopics
        );
    HRESULT SetDataObject (
        [in]                    BSTR          ServerClsIdString,
        [in]                    BSTR          Name,
        [in]                    BSTR          Type,
        [in, unique]  SAFEARRAY (BSTR) *      pProperties
        );
    HRESULT GetDataObject (
        [in]                    BSTR          ServerClsIdString,
        [in]                    BSTR          Name,
        [out]                   BSTR *        pType,
        [out]         SAFEARRAY (BSTR) *      pProperties
        );
    HRESULT RemoveDataObject (
        [in]                    BSTR          ServerClsIdString,
        [in]                    BSTR          Name);
    HRESULT RenameDataObject (
        [in]                    BSTR          ServerClsIdString,
        [in]                    BSTR          OldName,
        [in]                    BSTR          NewName);
    HRESULT BrowseDataObjects (
        [in]                    BSTR          ServerClsIdString,
        [out]         SAFEARRAY (BSTR) *      pDataObjects
        );
    HRESULT GetSystemObject (
        [in]                    BSTR          ServerClsIdString,
        [out]         SAFEARRAY (BSTR) *      pProperties
        );
    HRESULT SetSystemObject (
        [in]                    BSTR          ServerClsIdString,
        [in, unique]  SAFEARRAY (BSTR) *      pProperties
        );
    HRESULT RemoveSystemObject (
        [in]                    BSTR          ServerClsIdstring);
    }
Operations
BrowseDataObjects
Declaration
HRESULT BrowseDataObjects (
        [in]                    BSTR          ServerClsIdString,
        [out]         SAFEARRAY (BSTR) *      pDataObjects
        )
BrowseHierarchyObjects
Declaration
HRESULT BrowseHierarchyObjects (
        [in]                    BSTR          ServerClsIdString,
        [in]                    BSTR          BranchName,
        [out]         SAFEARRAY (BSTR) *      pBranches,
        [out]         SAFEARRAY (BSTR) *      pLeaves,
        [out]         SAFEARRAY (BSTR) *      pTopics
        )
```

-continued

```
ClearCfgFile
Declaration
HRESULT ClearCfgFile (
        [in]                        BSTR       ServerClsIdString
        )
Return Value
    S_OK The operation succeeded.
    E_FAIL The operation failed.
    E_OUTOFMEMORY Not enough memory
    E_INVALIDARG An argument to the function was invalid.
DeleteCfgFile
Declaration
HRESULT DeleteCfgFile (
        [in]                        BSTR       bstrServerClsIdString,
        [in]                        BSTR       bstrConfigurationSet
        )
Return Value
    S_OK The operation succeeded.
    E_FAIL The operation failed.
    E_OUTOFMEMORY Not enough memory
    E_INVALIDARG An argument to the function was invalid.
EnumCfgSets
Declaration
HRESULT EnumCfgSets (
        [in]                        BSTR       ServerClsIdString,
        [out]         SAFEARRAY (BSTR) *       pConfigSets
        )
Parameters
    pConfigSets    returns list wit configuration set (only names, no path)
GetCfgFileName
Declaration
HRESULT GetCfgFileName (
        [in]                        BSTR       ServerClsIdString,
        [out]                       BSTR *     pFileName
        )
Return Value
    S_OK The operation succeeded.
    E_FAIL The operation failed.
    E_OUTOFMEMORY Not enough memory
    E_INVALIDARG An argument to the function was invalid.
GetDataObject
Declaration
HRESULT GetDataObject (
        [in]                        BSTR       ServerClsIdString,
        [in]                        BSTR       Name,
        [out]                       BSTR *     pType,
        [out]         SAFEARRAY (BSTR) *       pProperties
        )
GetHierarchyObject
Declaration
HRESULT GetHierarchyObject (
        [in]                        BSTR       ServerClsIdString,
        [in]                        BSTR       Name,
        [out]                       BSTR *     pType,
        [out]                       BSTR *     pDelimiter,
        [out]         SAFEARRAY (BSTR) *       pProperties
        )
Return Value
    S_OK The operation succeeded.
    E_FAIL The operation failed.
    E_OUTOFMEMORY Not enough memory
    E_INVALIDARG An argument to the function was invalid.
GetLeafObject
Declaration
HRESULT GetLeafObject (
        [in]                        BSTR       ServerClsIdString,
        [in]                        BSTR       Name,
        [in]                        BSTR       Parent,
        [out]                       BSTR *     pType,
        [out]                       BSTR *     pDelimiter,
        [out]         SAFEARRAY (BSTR) *       pProperties
        )
Return Value
    S_OK The operation succeeded.
    E_FAIL The operation failed.
    E_OUTOFMEMORY Not enough memory
    E_INVALIDARG An argument to the function was invalid.
```

-continued

```
GetSystemObject
Declaration
HRESULT GetSystemObject (
        [in]                    BSTR            ServerClsIdString,
        [out]           SAFEARRAY (BSTR)  *     pProperties
        )
GetTopicObject
Declaration
HRESULT GetTopicObject (
        [in]                    BSTR            ServerClsIdString,
        [in]                    BSTR            Name,
        [in]                    BSTR            Parent,
        [out]                   BSTR      *     pType,
        [out]                   LONG      *     pUpdateInterval,
        [out]           SAFEARRAY (BSTR)  *     pProperties
        )
Return Value
    S_OK The operation succeeded.
    E_FAIL The operation failed.
    E_OUTOFMEMORY Not enough memory
    E_INVALIDARG An argument to the function was invalid.
RemoveDataObject
Declaration
HRESULT RemoveDataObject (
        [in]                    BSTR            ServerClsIdString,
        [in]                    BSTR            Name)
Return Value
    S_OK The operation succeeded.
    E_FAIL The operation failed.
    E_OUTOFMEMORY Not enough memory
    E_INVALIDARG An argument to the function was invalid.
RemoveHierarchyObject
Declaration
HRESULT RemoveHierarchyObject (
        [in]                    BSTR            ServerClsIdString,
        [in]                    BSTR            Name
        )
Return Value
    S_OK The operation succeeded.
    E_FAIL The operation failed.
    E_OUTOFMEMORY Not enough memory
    E_INVALIDARG An argument to the function was invalid.
RemoveLeafObject
Declaration
HRESULT RemoveLeafObject (
        [in]                    BSTR            ServerClsIdString,
        [in]                    BSTR            Name,
        [in]                    BSTR            Parent)
Return Value
    S_OK The operation succeeded.
    E_FAIL The operation failed.
    E_OUTOFMEMORY Not enough memory
    E_INVALIDARG An argument to the function was invalid.
RemoveSystemObject
Declaration
HRESULT RemoveSystemObject (
        [in]                    BSTR            ServerClsIdString)
Return Value
    S_OK The operation succeeded.
    E_FAIL The operation failed.
    E_OUTOFMEMORY Not enough memory
    E_INVALIDARG An argument to the function was invalid.
RemoveTopicObject
Declaration
HRESULT RemoveTopicObject (
        [in]                    BSTR            ServerClsIdString,
        [in]                    BSTR            Name,
        [in]                    BSTR            Parent)
Return Value
    S_OK The operation succeeded.
    E_FAIL The operation failed.
    E_OUTOFMEMORY Not enough memory
    E_INVALIDARG An argument to the function was invalid.
RenameDataObject
Declaration
HRESULT RenameDataObject (
        [in]                    BSTR            ServerClsIdString,
        [in]                    BSTR            OldName,
        [in]                    BSTR            NewName)
```

-continued

Return Value
    S_OK The operation succeeded.
    E_FAIL The operation failed.
    E_OUTOFMEMORY Not enough memory
    E_INVALIDARG An argument to the function was invalid.
RenameHierarchyObject
Declaration
HRESULT RenameHierarchyObject (
    [in]    BSTR    ServerClsIdString,
    [in]    BSTR    OldName,
    [in]    BSTR    NewName)
Return Value
    S_OK The operation succeeded.
    E_FAIL The operation failed.
    E_OUTOFMEMORY Not enough memory
    E_INVALIDARG An argument to the function was invalid.
RenameLeafObject
Declaration
HRESULT RenameLeafObject (
    [in]    BSTR    ServerClsIdString,
    [in]    BSTR    OldName,
    [in]    BSTR    Parent,
    [in]    BSTR    NewName)
Return Value
    S_OK The operation succeeded.
    E_FAIL The operation failed.
    E_OUTOFMEMORY Not enough memory
    E_INVALIDARG An argument to the function was invalid.
RenameTopicObject
Declaration
HRESULT RenameTopicObject (
    [in]    BSTR    ServerClsIdString,
    [in]    BSTR    OldName,
    [in]    BSTR    Parent,
    [in]    BSTR    NewName)
Return Value
    S_OK The operation succeeded.
    E_FAIL The operation failed.
    E_OUTOFMEMORY Not enough memory
    E_INVALIDARG An argument to the function was invalid.
SaveCfgSetAs
Declaration
HRESULT SaveCfgSetAs (
    [in]    BSTR    ServerClsIdString,
    [in]    BSTR    pConfigSet
)
SetCfgFileName
Declaration
HRESULT SetCfgFileName (
    [in]    BSTR    ServerClsIdString,
    [in]    BSTR    FileName
)
Return Value
    S_OK The operation succeeded.
    E_FAIL The operation failed.
    E_OUTOFMEMORY Not enough memory
    E_INVALIDARG An argument to the function was invalid.
SetDataObject
Declaration
HRESULT SetDataObject (
    [in]    BSTR    ServerClsIdString,
    [in]    BSTR    Name,
    [in]    BSTR    Type,
    [in, unique]    SAFEARRAY (BSTR) *    pProperties
)
SetHierarchyObject
Declaration
HRESULT SetHierarchyObject (
    [in]    BSTR    ServerClsIdString,
    [in]    BSTR    Name,
    [in]    BSTR    Type,
    [in]    BSTR    Delimiter,
    [in, unique]    SAFEARRAY (BSTR) *    pProperties
)
Return Value
    S_OK The operation succeeded.
    E_FAIL The operation failed.
    E_OUTOFMEMORY Not enough memory
    E_INVALIDARG An argument to the function was invalid.

```
SetLeafObject
Declaration
HRESULT SetLeafObject (
        [in]                    BSTR            ServerClsIdString,
        [in]                    BSTR            Name,
        [in]                    BSTR            Parent,
        [in]                    BSTR            Type,
        [in]                    BSTR            Delimiter,
        [in, unique]    SAFEARRAY (BSTR) *      pProperties
        )
Return Value
        S_OK The operation succeeded.
        E_FAIL The operation failed.
        E_OUTOFMEMORY Not enough memory
        E_INVALIDARG An argument to the function was invalid.
SetSystemObject
Declaration
HRESULT SetSystemObject (
        [in]                    BSTR            ServerClsIdString,
        [in, unique]    SAFEARRAY (BSTR) *      pProperties
        )
SetTopicObject
Declaration
HRESULT SetTopicObject (
        [in]                    BSTR            ServerClsIdString,
        [in]                    BSTR            Name,
        [in]                    BSTR            Parent,
        [in]                    BSTR            Type,
        [in]                    LONG            UpdateInterval,
        [in, unique]    SAFEARRAY (BSTR) *      pProperties
        )
Parameters
        Name    name of the topic
        Parent  fully qualified name
Return Value
        S_OK The operation succeeded.
        E_FAIL The operation failed.
        E_OUTOFMEMORY Not enough memory
        E_INVALIDARG An argument to the function was invalid.
SwitchToCfgSet
Declaration
HRESULT SwitchToCfgSet (
        [in]                    BSTR            ServerClsIdString,
        [in]                    BSTR            pConfigSet
        )
```

An IIOSrCfgrules interface 520 defines a set of methods for extracting configuration rules from a storage area such as the rules 270 via the remote infrastructure 250. This interface insulates the caller from the particulars of extracting or storing data on a particular physical

```
Declaration
[
        object,
        dual,
        uuid(52088D9A-DED4-11D3-83F2-00A024A866AD),
        helpstring("IIOSrvCfgRules Interface"),
        pointer_default(unique)
]
/*
This interface provides a way to extract the configuration rules from
the rules storage area
*/
        interface IIoSrvCfgRules : IDispatch
        {
        HRESULT GetCfgRuleFileName(
                [in]    BSTR            ServerClsIdstring,
                [out]   BSTR *          pFileName
        );
        HRESULT SetCfgRuleFileName(
                [in]    BSTR            ServerClsIdString,
                [in]    BSTR            pFileName
        );
```

```
HRESULT GetHostClsIds(
        [in]    BSTR            ServerClsIdString,
        [out]   BSTR *          pPackageClsIdString,
        [out]   BSTR *          pEditorHostClsIdString
);
HRESULT GetRulesForObjectType(
        [in]    BSTR            ServerClsIdstring,
        [in]    BSTR            ObjectType,
        [out]   BSTR *          pEditorClsIdString,
        [out]   BSTR *          pPackageClsIdString,
        [out]   BSTR *          pDelimiter
);
HRESULT GetCfgChildRulesForObjectType(
        [in]    BSTR            ServerClsIdString,
        [in]    BSTR            Type,
        [out]   SAFEARRAY(BSTR) *       ChildTypes,
        [out]   SAFEARRAY(LONG) *       ChildTypesMaxOccurs,
        [out]   LONG *          pOptions
);
HRESULT GetCfgPropertyRulesForObjectType(
        [in]    BSTR            ServerClsIdString,
        [in]    BSTR            Type,
        [out]   SAFEARRAY(BSTR) *       PropertyName,
        [out]   SAFEARRAY(LONG) *       PropertyType,
        [out]   SAFEARRAY(VARIANT) *    DefaultValue,
        [out]   SAFEARRAY(VARIANT) *    PropertyMin,
        [out]   SAFEARRAY(VARIANT) *    PropertyMax,
```

```
            [out]   SAFEARRAY(BSTR) *      PropertyEditHeader,
            [out]   SAFEARRAY(BSTR) *      PropertyEditunit,
            [out]   SAFEARRAY(BSTR) *      PropertyEditHelp,
            [out]   SAFEARRAY(LONG) *      PropertyAccessRights
        );
    }
Operations GetCfgChildRulesForObjectType
Declaration
HRESULT GetCfgChildRulesForObjectType(
            [in]    BSTR                   ServerClsIdstring,
            [in]    BSTR                   Type,
            [out]   SAFEARRAY(BSTR) *      ChildTypes,
            [out]   SAFEARRAY(LONG) *      ChildTypesMaxOccurs,
            [out]   LONG *                 pOptions
        )
Parameters
    ServerClsIdString       server ClsId.
    Type                    type name - if rules for the root are to be
                            retrieved pass empty string:
    ChildTypes              Get the array of possible child types. The
                            configuration snap-in displays these types as
                            choices to the user to create child objects
    ChildTypesMaxOccurs     Number of maximum occurrences of the
                            corresponding child object type.
    pOptions                List of bit-options in returned DWORD
                            currently 3 bits are defined:
Remarks
Gets the child rules for object type. Rules are user type based. This means
that objects with the same user type have the same set of rules.
GetCfgPropertyRulesForObjectType
Declaration
HRESULT GetCfgPropertyRulesForObjectType(
            [in]    BSTR                       ServerClsIdString,
            [in]    BSTR                       Type,
            [out]   SAFEARRAY(BSTR) *          PropertyName,
            [out]   SAFEARRAY(LONG) *          PropertyType,
            [out]   SAFEARRAY(VARIANT) *       DefaultValue,
            [out]   SAFEARRAY(VARIANT) *       PropertyMin,
            [out]   SAFEARRAY(VARIANT) *       PropertyMax,
            [out]   SAFEARRAY(BSTR) *          PropertyEditHeader,
            [out]   SAFEARRAY(BSTR) *          PropertyEditUnit,
            [out]   SAFEARRAY(BSTR) *          PropertyEditHelp,
            [out]   SAFEARRAY(LONG) *          PropertyAccessRights
        )
Parameters
    ServerClsIdString       server clsid.
    Type                    type name - if rules for the root are to be
                            retrieved pass empty string:
    PropertyName            Array of unique property names. The
                            configuration snap-in will display an edit
                            field for each property.
    PropertyType            Array of property types. The configuration
                            snap-in uses this type to perform validation
                            on user input.
    Default Value           Array of property default values. The
                            configuration snap-in uses this value to
                            initialize user input values. Any configura-
                            tion data client uses this as the default value
                            if not present. In the case of
                            VARIANT_EMPTY there is no default
                            value.
    PropertyMin             Array of minimum property values. The
                            configuration snap-in uses this value to
                            validate user input values. In case of type
                            'STRING' this represents the minimum
                            number of (UNICODE) characters.
    PropertyMax             Array of maximum property values. The
                            configuration snap-in uses this value to
                            validate user input values. In case of type
                            'STRING' this represents the maximum
                            number of (UNICODE) characters.
    PropertyEditHeader      Array of property edit headers. The
                            configuration snap-in uses this value to
                            precede the edit field for user input.
    PropertyEditUnit        Array of property edit units. The configura-
                            tion snap-in uses this string to be diplayed
                            after the edit field for user input.

PropertyEditHelp        Array of property edit help strings. The
                            configuration snap-in uses this string to
                            display an online help string on user request
                            for the corresponding edit field.
    PropertyAccessRights    Array of property edit lock flags. The
                            configuration snap-in uses this value to
                            determine the accessrights on this property.
Remarks
    Gets the property rules for object type. Rules are user type based.
This means that objects with the same user type have the same set of rules.
GetCfgRuleFileName
Declaration
HRESULT GetCfgRuleFileName(
            [in]    BSTR                   ServerClsIdString,
            [out]   BSTR *                 pFileName
        )
Parameters
    ServerClsIdString       DAS server class ID
    pFileName               pointer to file name
Remarks
retrieves the cfg rule file name of the active configuration file of the
server. The configuration snap-in usually does not need to know this file
name. This is only for informational purposes
GetHostClsIds
Declaration
HRESULT GetHostClsIds
            [in]    BSTR                   ServerClsIdString,
            [out]   BSTR *                 pPackageClsIdString,
            [out]   BSTR *                 pEditorHostClsIdString
        )
Parameters
    ServerClsIdString       DAS server class ID
    PPackageClsIdString     Clsid of the package
    PEditorHostClsIdString  Clsid of the editor host
Remarks
retrieves the editor ClsId for a given object type
GetRulesForObjectType
Declaration
HRESULT GetRulesForObjectType(
            [in]    BSTR                   ServerClsIdString,
            [in]    BSTR                   ObjectType,
            [out]   BSTR *                 pEditorClsIdString,
            [out]   BSTR *                 pPackageClsIdString,
            [out]   BSTR *                 pDelimiter
        )
Parameters
    ServerClsIdString       DAS server class ID
    Object Type             object type (value of the type attribute of the
                            corresponding object in the configuration
                            file)
    pEditorClsIdString      Clsid of the editor ActiveX responsible for
                            editing all object properties
    pPackageClsIdString     Clsid of the package
    pDelimiter              Delimiter of the type (post delimiter)
Remarks
retrieves the editor ClsId for a given object type
SetCfgRuleFileName
Declaration
HRESULT SetCfgRuleFileName
            [in]    BSTR                   ServerClsIdstring,
            [in]    BSTR                   pFileName
        )
Parameters
    ServerClsIdString       DAS server class ID
    pFileName               file name
Remarks
    Sets the rules file name
```

Figure 7:
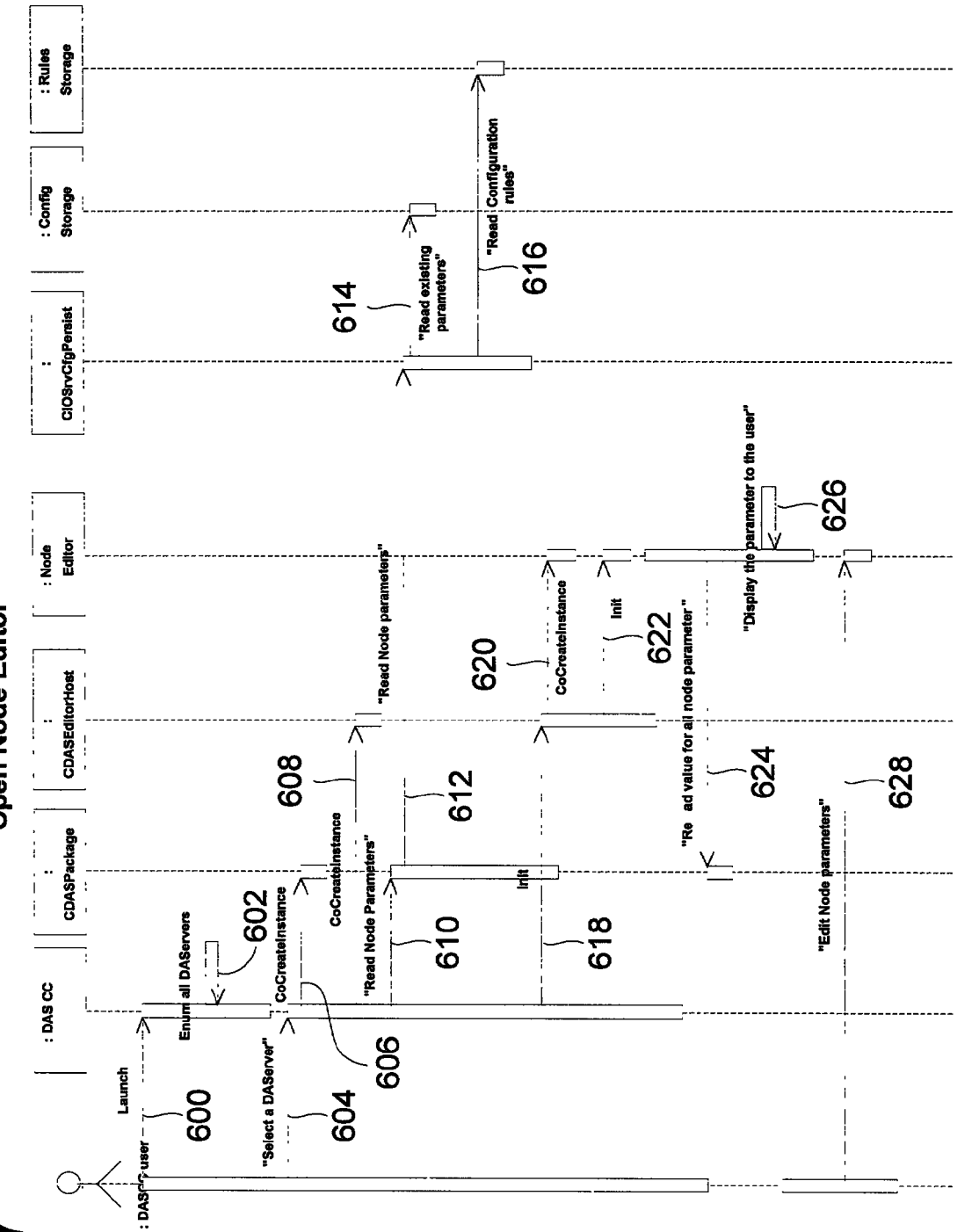
FIG. 7 is a sequence diagram summarizing a set of steps performed to open a node editor to commence editing a configuration for a selected data access server on a remote node.

Turning to FIG. 7, a sequence diagram depicts a set of steps executed when a node editor opens and a particular data access server is selected by a user. During step 600, a user launches the DAS console client via an MMC. In response, the DASCC communicates with DAS Agents located on each node supporting a DAS to enumerate all DAS's on the network during step 602. Next, during step 604 a user selects one of the enumerated DAS's for configuration, and during steps 606 and 608 the DASCC issues requests to create an instance of the Package Host 210 object and an instance of the Editor Host 230. If a node package or node editor is specified, then these objects too are instantiated.

After creating the above configuration components, at step 610 the DASCC issues a request to the Package Host 210 to request a set of node configuration parameters for a node containing the data access server selected by the user during step 604. At step 612 the Package Host 210 passes the read request to the remote infrastructure via the CIOSrvCfgPersist interface 510. The remote infrastructure calls the configuration storage 280 to read the existing parameters associated with the selected DAS during step 614, and calls the rules storage 2270 to read any applicable rules associated with the selected DAS during step 616. The retrieved configuration parameters and rules are then returned to the calling Package Host 210.

During step 618 the DAS control consol issues an "init" call on the previously created Editor Host 230. In response, during steps 620 and 622 the Editor Host 230 creates an instance of the Node Editor 240 custom face plate specified by the accessed node and then forwards the "init" call to the Node Editor 240. At step 624 the Node Editor 240 calls the Package Host 210 to obtain values for each parameter specified by the node (and any associated rules) and then displays the configuration parameters in accordance with the associated rules via the custom face plate during step 626. Thereafter, the user issues requests to the Node Editor 240 to change node parameters in association with a configuration session for the selected DAS.

Figure 8:
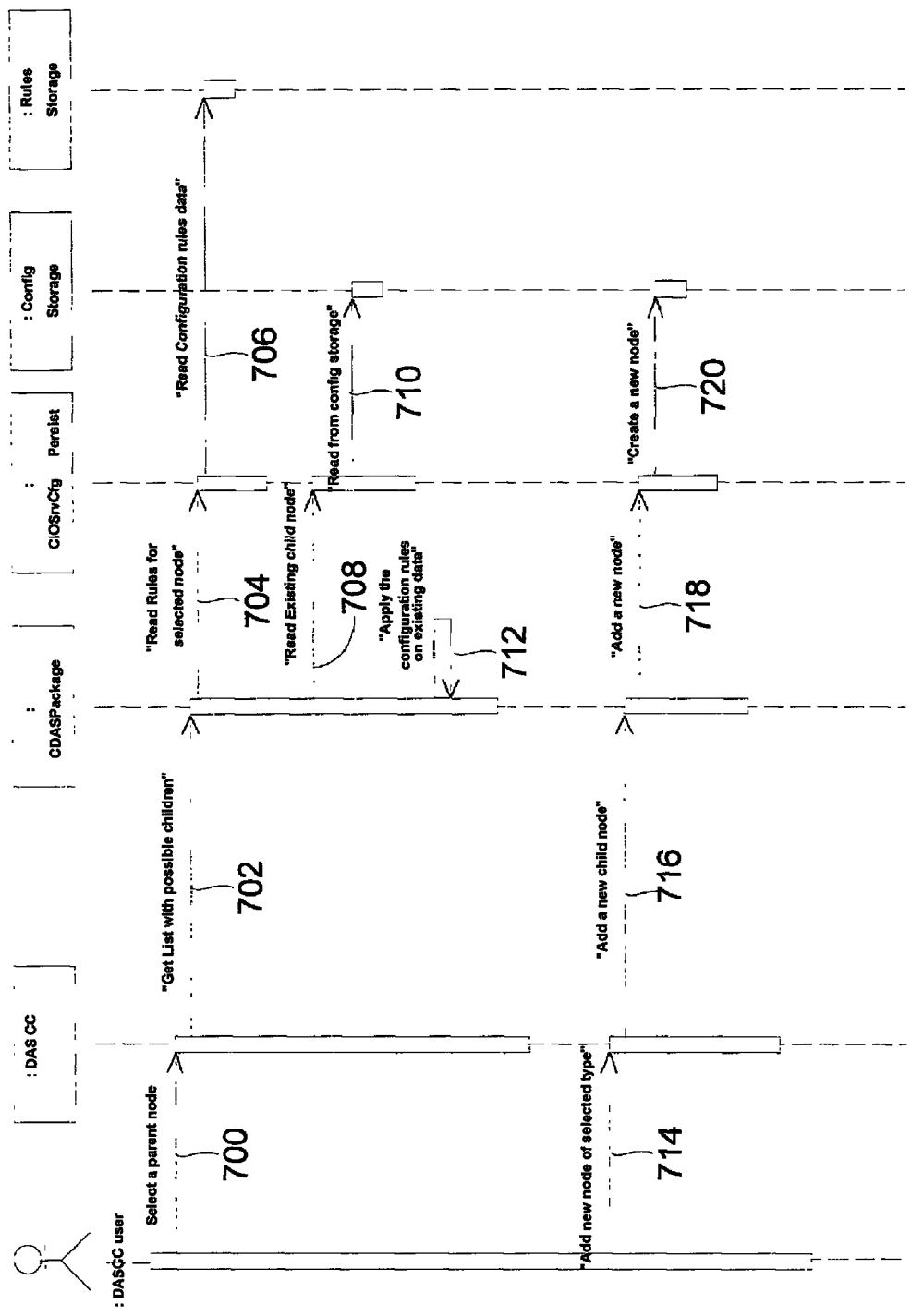
FIG. 8 is a sequence diagram summarizing a set of steps for adding a node to a configuration hierarchy.

Turning to FIG. 8, a sequence diagram depicts a series of exemplary steps performed to edit an existing configuration, and in particular add a new node in a configuration hierarchy specified for a selected data access server. During step 700 the user selects a parent node (type) to add to a configuration by passing an appropriate user interface request to the DASCC 200. In response, during step 702 the DASCC 200 issues a request to the Package Host 210 to get a list of configuration parameters and rules associated with the selected node type (including any children nodes). At step 704 the Package Host 210 requests, from the CIOSrvCfgPersist object 500, all rules for the selected node. Thereafter, the CIOSrvCfgPersist object 500 passes the configuration rules request to the rules storage 270. Next, at step 708 the Package Host 210 issues a request to read the child node parameters for the selected node to the CIOSrvCfgPersist object 500. In response at step 710 the request is passed to the configuration storage 280. Upon receiving both the appropriate rules and parameters, the Package Host applies the configuration rules to the retrieved parameters to create an appropriate parent node structure.

Thereafter, at step 714 the user issues an interface command to the DASCC 200 to add a new node of the previously selected type. Next, at step 716 the DASCC 200 issues a request to the Package Host 210 to add a new node to a selected/identified child node within a configuration hierarchy. At step 718 the Package Host 210 calls the CIOSrvCfgPersist object 500 to add a new node to the storage area for currently selected configuration. Thereafter, at step 720 the CIOSrvCfgPersist object 500 issues a request to the configuration storage 280 to store the created new node.

Figure 9:
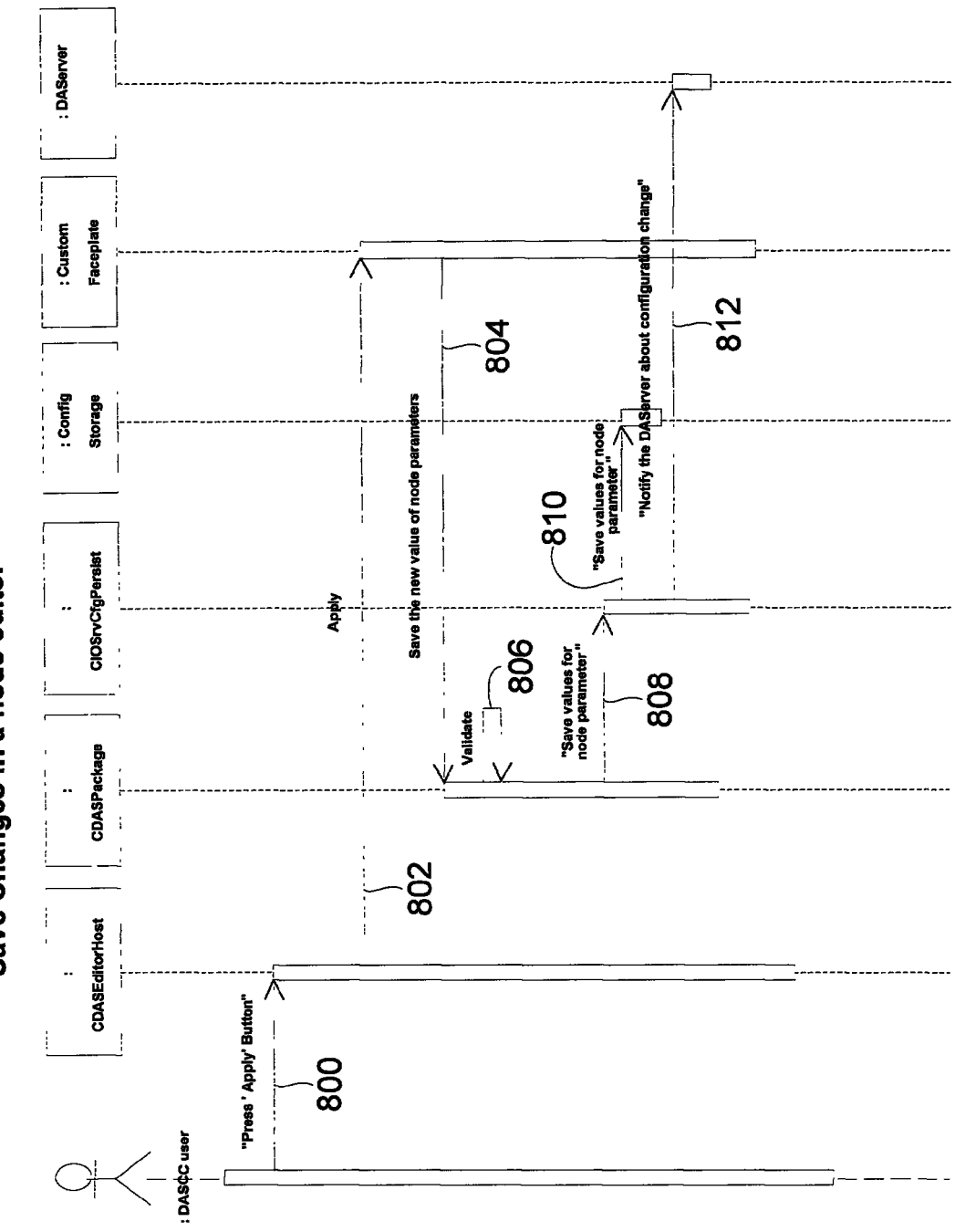
FIG. 9 is a sequence diagram summarizing a set of steps for saving changes made via the configuration facility in a remote configuration storage.

Turning to FIG. 9, a sequence diagram depicts the steps for saving changes made to a configuration using the previously described distributed configuration components. In response to a user issuing a save request by selecting an "apply" button on the user interface of the Editor Host 230 during step 800. In response, during step 802 the Editor Host 230 passes a call to save configuration changes to the Node Editor 240 (node type-specific faceplate). In response, during step 804 the Node Editor 240 calls the Package Host 210 with a request to save the new values of the node parameters. The Package Host 210, with reference possibly to the custom node package 220, validates the requested node change information during step 806. During step 808 the Package Host 210 calls the CIOSrvCfgPersist object 500 requesting a save operation on a set of specified node parameters. The CIOSrvCfgPersist object 500 carries out the save request at step 810 by storing the changed parameter values in the configuration storage 280. After the new configuration information is placed in the configuration storage 280, the CIOSrvCfgPersist object 500 determines whether the affected DAS is currently running. In the case that the DAS is running, at step 812 the CIOSrvCfgPersist object 500 notifies the corresponding DAS of the changes (including specifying the nodes that were changed). The notification mechanism embodied in step 812 facilitates hot configuration of a running data access server. In response, the server reads the new values from the configuration storage 280 and updates its configuration at a point in time when such changes do not disrupt the ongoing operation of the DAS.

The following is a set of type definitions utilized in an exemplary implementation of the Package Host 210 and the Node Editor 240.

```
Type Definitions:
ATTR_PROPERTYIDS
Declaration
enum
{
    _PROPERTY_INVALID_PROPID_= 0,
    _PROPERTY_NAME_,
    _PROPERTY_TYPE_,
    _PROPERTY_VALUE_,
    _PROPERTY_MIN_,
    _PROPERTY_MAX_,
    _PROPERTY_HEADER_,
    _PROPERTY_EUNITS_,
    _PROPERTY_HELP_,
    _PROPERTY_ACCESSRIGHTS_,
}
Description
        Specifies the Attribute properties
Elements
    _PROPERTY_VALUE_
    _PROPERTY_HEADER_
    _PROPERTY_MAX_
```

```
    _PROPERTY_MIN_
    _PROPERTY_INVALID_PROPID_ Zero is reserved for invalid PropID
    _PROPERTY_TYPE_
    _PROPERTY_HELP_
    _PROPERTY_ACCESSRIGHTS_
    _PROPERTY_EUNITS_
    _PROPERTY_NAME_
COMMIT_ENUM
Declaration
enum {
    COMMIT_OK = 1,
    COMMIT_INVALID_HANDLE,
    COMMIT_FAIL,
    COMMIT_REMOTE_FAIL
}
Description
    Specifies the options for status of Commit operation
Elements
    COMMIT_INVALID_HANDLE
    COMMIT_REMOTE_FAIL
    COMMIT_OK
    COMMIT_FAIL
IOSRVPROPERTY
Declaration
typedef struct tagIOSRVPROPERTY {
            [string]   BSTR    szKey;
            [string]   BSTR    szProperty; } IOSRVPROPERTY
Description
    Describes a parameter's name and value.
PROPERTYACCESSRIGHT
Declaration
typedef enum    tagPROPERTYACCESSRIGHTS {
            PROPERTYACCESSRIGHT_ALL = 0,
            PROPERTYACCESSRIGHT_LOCKED = 1 } PROPERTYACCESSRIGHT
Description
    Describes user access rights for a property
SHAPE_INFO_ENUM
Declaration
enum {
    SHAPE_INFO_ATTRIBUTES = 1,
    SHAPE_INFO_NODES,
    SHAPE_INFO_TOPICS,
    SHAPE_INFO_LEAVES
}
Description
    Specifies the Shape information options
Elements
    SHAPE_INFO_ATTRIBUTES
    SHAPE_INFO_TOPICS
    SHAPE_INFO_LEAVES
    SHAPE_INFO_NODES
```

The following is an example of the rule file 270 which makes up a first part of a remote configuration specification's persistence area. A set of tag explanations precedes the actual example.

| KEY | XML Attributes | Explanation |
|---|---|---|
| <CONFIGURATIONRULES> | NAME<br>PACKAGEHOSTID<br>EDITORHOSTID | Root key for the configuration rules (DAS related data is inside this root key only). The presence of this root key potentially allows additional (user-) data to be stored in the same file under parallel root keys. |
| <HIERARCHYNODE> | TYPE<br>EDITORID<br>PACKAGEID<br>DELIMITER | Key for rule for an object of type "TYPE" (related to a DAS object type). TYPE (server specific class) and NAME are required - DELIMITER is optional (defaults to "." If not present) |
| <CHILDRULES> | ENABLEDEVICEGROUPS<br>ENABLEDEVICEITEMS<br>ENABLESYSTEMITEMS | Sub-key for CHILDRULES of an object of type "NAME". DEVICEGROUPS, DEVICEITEMS, SYSTEMITEMS are keys for boolean |

| | | |
|---|---|---|
| | | flags allowing the specified objects on this branch object of type "NAME". |
| <"user type"> | MAXOCCURENCES MINOCCURENCES | User type Key for an object under child rules. |
| <PROPERTYRULES> | | Key for properties/editor element |
| <PROPERTYTYPE> | | Key for the variant property type under property rules. |
| <DEFAULTVALUE> | | Key for the property default value under property rules. |
| <PROPERTYMIN> | | Key for the property minimum value under property rules. |
| <PROPERTYMAX> | | Key for the property maximum value under property rules.. |
| <PROPERTYEDITHEADER> | | Key for the property edit field header under property rules.. |
| <PROPERTYUNIT> | | Key for the property edit field unit under property rules.. |
| <PROPERTYHELP> | | Key for the property edit field help under property rules.. |

```
?xml version="1.0" encoding="UTF-8"?>
<CONFIGURATIONRULES NAME="DAS ABTCP" PACKAGEHOSTID="{7F5B8DEE-AB78-11D4-93E4-
00B0D0201D61}" EDITORHOSTID="{5C9AF1AA-AEC8-11D4-93E6-00B0D0201D61}">
    <HIERARCHYNODE TYPE="$ROOT$">
        <CHILDRULES ENABLEDEVICEGROUPS="1" ENABLEDEVICEITEMS="0"
ENABLESYSTEMITEMS="1">
            <PORT_TCPIP MAXOCCURRENCES="1"/>
        </CHILDRULES>
        <PROPERTYRULES>
            <UpdateInterval>
                <PROPERTYTYPE>VT_I4</PROPERTYTYPE>
                <DEFAULTVALUE>1000</DEFAULTVALUE>
                <PROPERTYMIN>0</PROPERTYMIN>
                <PROPERTYMAX>100000</PROPERTYMAX>
                <PROPERTYEDITUNIT>ms</PROPERTYEDITUNIT>
                <PROPERTYEDITHELP>Update interval of default topics for hierarchies without overriding
configuration</PROPERTYEDITHELP>
            </UpdateInterval>
            <SlowPollInterval>
                <PROPERTYTYPE>VT_I4</PROPERTYTYPE>
                <DEFAULTVALUE>10000</DEFAULTVALUE>
                <PROPERTYMIN>0</PROPERTYMIN>
                <PROPERTYMAX>100000</PROPERTYMAX>
                <PROPERTYEDITIUNIT>ms</PROPERTYEDITUNIT>
                <PROPERTYEDITHELP>Update interval of topics for hierarchies in slow poll
mode</PROPERTYEDITHELP>
            </SlowPollInterval>
            <CaseSensitive>
                <PROPERTYTYPE>VT_I4</PROPERTYTYPE>
                <DEFAULTVALUE>0<DEFAULTVALUE>
                <PROPERTYMIN>0</PROPERTYMIN>
                <PROPERTYMAX>1</PROPERTYMAX>
                <PROPERTYEDITUNIT>T/F</PROPERTYEDITUNIT>
                <PROPERTYEDITHELP>TRUE means case-sensitive Device Group and Item ID
names</PROPERTYEDITHELP>
            </CaseSensitive>
            <DefaultPokeMode>
                <PROPERTYTYPE>VT_I4</PROPERTYTYPE>
                <DEFAULT VALUE>1</DEFAULTVALUE>
                <PROPERTYMIN>0</PROPERTYMIN>
                <PROPERTYMAX>2</PROPERTYMAX>
                <PROPERTYEDITUNIT/>
                <PROPERTYEDITHELP>0=Control, 1=Transition, 2=Optimized, </PROPERTYEDITHELP>
            </DefaultPokeMode>
            <DefaultDelimiter>
                <PROPERTYTYPE>VT_BSTR</PROPERTYTYPE>
                <DEFAULTVALUE>.</DEFAULTVALUE>
                <PROPERTYMIN>1</PROPERTYMIN>
                <PROPERTYMAX>3</PROPERTYMAX>
                <PROPERTYEDITUNIT/>
                <PROPERTYEDITHELP>Delimiter for hierarchies not configured</PROPERTYEDITHELP>
            </DefaultDelimiter>
            <SimulationMode>
                <PROPERTYTYPE>VT_I4</PROPERTYTYPE>
                <DEFAULTVALUE>0</DEFAULT VALUE>
                <PROPERTYMIN>0</PROPERTYMIN>
                <PROPERTYMAX>1</PROPERTYMAX>
                <PROPERTYEDITUNIT>T/F</PROPERTYEDITUNIT>
                <PROPERTYEDITHELP>TRUE means simulate for DAServers that support
```

-continued

```xml
simulation</PROPERTYEDITHELP>
    </SimulationMode>
    <EnableSystemItems>
        <PROPERTYTYPE>VT_I4</PROPERTYTYPE>
        <DEFAULTVALUE>1</DEFAULTVALUE>
        <PROPERTYMIN>0</PROPERTYMIN>
        <PROPERTYMAX>1</PROPERTYMAX>
        <PROPERTYEDITUNIT>T/F</PROPERTYEDITUNIT>
        <PROPERTYEDITHELP>TRUE to allow system items</PROPERTYEDITHELP>
    </EnableSystemItems>
    <LinkTopicCache>
        <PROPERTYTYPE>VT_UI4</PROPERTYTYPE>
        <DEFAULTVALUE>0</DEFAULTVALUE>
        <PROPERTYMIN>0</PROPERTYMIN>
        <PROPERTYMAX>1</PROPERTYMAX>
        <PROPERTYEDITUNIT>T/F</PROPERTYEDITUNIT>
        <PROPERTYEDITHELP>TRUE merges all subscription items in a single cache</PROPERTYEDITHELP>
    </LinkTopicCache>
    <UniqueDeviceGroup>
        <PROPERTYTYPE>VT_UI4</PROPERTYTYPE>
        <DEFAULTVALUE>1</DEFAULTVALUE>
        <PROPERTYMIN>0</PROPERTYMIN>
        <PROPERTYMAX>1</PROPERTYMAX>
        <PROPERTYEDITUNIT>T/F</PROPERTYEDITUNIT>
        <PROPERTYEDITHELP>TRUE requires all device group names be unique</PROPERTYEDITHELP>
    </UniqueDeviceGroup>
    <ProtocolTimerTick>
        <PROPERTYTYPE>VT_UI4</PROPERTYTYPE>
        <DEFAULTVALUE>50</DEFAULTVALUE>
        <PROPERTYMIN>10</PROPERTYMIN>
        <PROPERTYMAX>100000</PROPERTYMAX>
        <PROPERTYEDITUNIT>ms</PROPERTYEDITUNIT>
        <PROPERTYEDITHELP>Protocol timer tick interval in milliseconds</PROPERTYEDITHELP>
    </ProtocolTimerTick>
    <TransactionTimeout>
        <PROPERTYTYPE>VT_UI4</PROPERTYTYPE>
        <DEFAULTVALUE>60000</DEFAULTVALUE>
        <PROPERTYMIN>10</PROPERTYMIN>
        <PROPERTYMAX>60000</PROPERTYMAX>
        <PROPERTYEDITUNIT>ms</PROPERTYEDITUNIT>
        <PROPERTYEDITHELP>Default transaction timeout for hierarchies with no
configuration</PROPERTYEDITHELP>
    </TransactionTimeout>
    <LockConfigurationFile>
        <PROPERTYTYPE>VT_BOOL<PROPERTYTYPE>
        <DEFAULTVALUE>0</DEFAULTVALUE>
        <PROPERTYMIN>0</PROPERTYMIN>
        <PROPERTYMAX>1</PROPERTYMAX>
        <PROPERTYEDITUNIT>T/F</PROPERTYEDITUNIT>
        <PROPERTYEDITHELP>TRUE for non-Magellan configurers locked out</PROPERTYEDITHELP>
    </LockConfigurationFile>
    <SubscriptionTransactionRatio>
        <PROPERTYTYPE>VT_UI4</PROPERTYTYPE>
        <DEFAULTVALUE>2</DEFAULTVALUE>
        <PROPERTYMIN>1</PROPERTYMIN>
        <PROPERTYMAX>1000</PROPERTYMAX>
        <PROPERTYEDITUNIT/>
        <PROPERTYEDITHELP>Subscription / Transaction ratio</PROPERTYEDITHELP>
    </SubscriptionTransactionRatio>
    </PROPERTYRULES>
</HIERARCHYNODE>
<HIERARCHYNODE TYPE="PORT_TCPIP" EDITORID="{1B48839F-B68E-4CDA-A090-C8BD87932126}"
PACKAGEID="{7F5B8DEE-AB78-11D4-93E4-00B0D0201D61}" DELIMITER=".">
    <CHILDRULES>
        <PLC5_TCPIP MAXOCCURRENCES="100"/>
        <SLC500_TCPIP MAXOCCURRENCES="100"/>
        <PYRAMID_EI MAXOCCURRENCES="100"/>
    </CHILDRULES>
    <PROPERTYRULES>
        <MaxQueuedMsgs>
            <!--Maximum number of queued messages for a topic-->
            <PROPERTYTYPE>VT_UI4</PROPERTYTYPE>
            <DEFAULTVALUE>4</DEFAULTVALUE>
            <PROPERTYMIN>1</PROPERTYMIN>
            <PROPERTYMAX>20</PROPERTYMAX>
            <PROPERTYEDITHEADER>Max QueuedMsgs</PROPERTYEDITHEADER>
            <PROPERTYEDITUNIT/>
            <PROPERTYEDITHELP>Number of Messages</PROPERTYEDITHELP>
        </MaxQueuedMsgs>
```

-continued

```
    <MaxSockets>
        <PROPERTYTYPE>VT_UI4</PROPERTYTYPE>
        <DEFAULTVALUE>200</DEFAULTVALUE>
        <PROPERTYMIN>1</PROPERTYMIN>
        <PROPERTYMAX>200</PROPERTYMAX>
        <PROPERTYEDITHEADER>Maximum number of sockets</PROPERTYEDITHEADER>
        <PROPERTYEDITUNIT/>
        <PROPERTYEDITHELP>Maximum number of sockets</PROPERTYEDITHELP>
    </MaxSockets>
    <MaxUnsolConn>
        <PROPERTYTYPE>VT_UI4</PROPERTYTYPE>
        <DEFAULTVALUE>20</DEFAULTVALUE>
        <PROPERTYMIN>1</PROPERTYMIN>
        <PROPERTYMAX>30</PROPERTYMAX>
        <PROPERTYEDITHEADER>Maximum number of peer-to-peer
connections</PROPERTYEDITHEADER>
        <PROPERTYEDITUNIT/>
        <PROPERTYEDITHELP>Maximum number of peer-to-peer connections</PROPERTYEDITHELP>
    </MaxUnsolConn>
    <UnsolicitedMsgTimeout>
        <PROPERTYTYPE>VT_UI4</PROPERTYTYPE>
        <DEFAULTVALUE>5000</DEFAULTVALUE>
        <PROPERTYMIN>1000</PROPERTYMIN>
        <PROPERTYMAX>10000</PROPERTYMAX>
        <PROPERTYEDITHEADER>Timeout for peer-to-peer unsolicited
communication</PROPERTYEDITHEADER>
        <PROPERTYEDITUNIT>MSec</PROPERTYEDITUNIT>
        <PROPERTYEDITHELP>Timeout for peer-to-peer unsolicited communication</PROPERTYEDITHELP>
    </UnsolicitedMsgTimeout>
    <FlipStringBytes>
        <!--Flip String Bytes-->
        <PROPERTYTYPE>VT_BOOL</PROPERTYTYPE>
        <DEFAULTVALUE>0</DEFAULTVALUE>
        <PROPERTYMIN>0<PROPERTYMIN>
        <PROPERTYMAX>1</PROPERTYMAX>
        <PROPERTYEDITHEADER>Flip String Bytes</PROPERTYEDITHEADER>
        <PROPERTYEDITUNIT/>
        <PROPERTYEDITHELP>Flip String Bytes</PROPERTYEDITHELP>
    </FlipStringBytes>
    </PROPERTYRULES>
</HIERARCHYNODE>
<HIERARCHYNODE TYPE="PLC5_TCPIP" PACKAGEID="" EDITORID="{85B57144-49F8-47D2-B5B7
E55CD82CFBC2}" DELIMITER=".">
    <CHILDRULES ENABLEDEVICEGROUPS="1">
    <PROPERTYRULES>
        <HostName>
            <PROPERTYTYPE>VT_BSTR</PROPERTYTYPE>
            <DEFAULT VALUE/>
            <PROPERTYMIN>0</PROPERTYMIN>
            <PROPERTYMAX>255</PROPERTYMAX>
            <PROPERTYEDITHEADER>device IP address</PROPERTYEDITHEADER>
            <PROPERTYEDITUNIT/>
            <PROPERTYEDITHELP>Device IP Host Name/Address</PROPERTYEDITHELP>
        </HostName>
        <DataBlockSize>
            <PROPERTYTYPE>VT_UI4</PROPERTYTYPE>
            <DEFAULTVALUE>2000</DEFAULT VALUE>
            <PROPERTYMIN>2</PROPERTYMIN>
            <PROPERTYMAX>2000</PROPERTYMAX>
            <PROPERTYEDITHEADER>Message data block size (bytes) for PLC5 on
Ethernet</PROPERTYEDITHEADER>
            <PROPERTYEDITUNIT/>
            <PROPERTYEDITHELP>Message data block size (bytes) for PLC5 on
Ethernet</PROPERTYEDITHELP>
        </DataBlockSize>
        <ReplyTimeout>
            <PROPERTYTYPE>VT_UI4</PROPERTYTYPE>
            <DEFAULTVALUE>15</DEFAULTVALUE>
            <PROPERTYMIN>1</PROPERTYMIN>
            <PROPERTYMAX>300</PROPERTYMAX>
            <PROPERTYEDITHEADER>Reply Timeout</PROPERTYEDITHEADER>
            <PROPERTYEDITUNIT>Sec</PROPERTYEDITUNIT>
            <PROPERTYEDITHELP>Reply Timeout</PROPERTYEDITHELP>
        </ReplyTimeout>
        <SupportsPID>
            <PROPERTYTYPE>VT_BOOL</PROPERTYTYPE>
            <DEFAULTVALUE>1</DEFAULTVALUE>
            <PROPERTYMIN>0</PROPERTYMIN>
            <PROPERTYMAX>1</PROPERTYMAX>
```

```xml
        <PROPERTYEDITHEADER>Support PID and String Files</PROPERTYEDITHEADER>
        <PROPERTYEDITUNIT/>
        <PROPERTYEDITHELP>Support PID and String Files</PROPERTYEDITHELP>
      </SupportsPID>
      <UnsolClientMsg>
        <PROPERTYTYPE>VT_BOOL</PROPERTYTYPE>
        <DEFAULTVALUE>1</DEFAULTVALUE>
        <PROPERTYMIN>0</PROPERTYMIN>
        <PROPERTYMAX>1</PROPERTYMAX>
        <PROPERTYEDITHEADER>Support Unsolicited 'CLIENT' Messaging</PROPERTYEDITHEADER>
        <PROPERTYEDITUNIT/>
        <PROPERTYEDITHELP>Support Unsolicited 'CLIENT' Messaging</PROPERTYEDITHELP>
      </UnsolClientMsg>
      <ConnectionTimeout>
        <!--Connection Timeout-->
        <PROPERTYTYPE>VT_U4</PROPERTYTYPE>
        <DEFAULTVALUE>2000</DEFAULTVALUE>
        <PROPERTYMIN>1000</PROPERTYMIN>
        <PROPERTYMAX>20000</PROPERTYMAX>
        <PROPERTYEDITHEADER>Connection Attempt Timeout</PROPERTYEDITHEADER>
        <PROPERTYEDITUNIT/>MSec</PROPERTYEDITUNIT>
        <PROPERTYEDITHELP>Connection Attempt Timeout</PROPERTYEDITHELP>
      </ConnectionTimeout>
    </PROPERTYRULES>
  </HIERARCHYNODE>
  <HIERARCHYNODE TYPE="SLC500_TCPIP" PACKAGEID=""EDITORID="{63B40882-4981-41F0-868B-CBCD508C0733}" DELIMITER=".">
    <CHILDRULES ENABLEDEVICEGROUPS="1"/>
    <PROPERTYRULES>
      <HostName>
        <PROPERTYTYPE>VT_BSTR</PROPERTYTYPE>
        <DEFAULTVALUE>10.32.12.36</DEFAULTVALUE>
        <PROPERTYMIN>0</PROPERTYMIN>
        <PROPERTYMAX>255<PROPERTYMAX>
        <PROPERTYEDITHEADER>device IP address</PROPERTYEDITHEADER>
        <PROPERTYEDITUNIT/>
        <PROPERTYEDITHELP>Device IP Host Name/Address</PROPERTYEDITHELP>
      </HostName>
      <DataBlockSize>
        <PROPERTYTYPE>VT_UI4</PROPERTYTYPE>
        <DEFAULTVALUE>510</DEFAULTVALUE>
        <PROPERTYMIN>2</PROPERTYMIN>
        <PROPERTYMAX>510</PROPERTYMAX>
        <PROPERTYEDITHEADER>Data packet size for PLC5 on Ethernet</PROPERTYEDITHEADER>
        <PROPERTYEDITUNIT/>
        <PROPERTYEDITHELP>Data packet size for PLC5 on Ethernet</PROPERTYEDITHELP>
      </DataBlockSize>
      <ReplyTimeout>
        <PROPERTYTYPE>VT_UI4</PROPERTYTYPE>
        <DEFAULTVALUE>15</DEFAULTVALUE>
        <PROPERTYMIN>1</PROPERTYMIN>
        <PROPERTYMAX>300</PROPERTYMAX>
        <PROPERTYEDITHEADER>ReplyTimeout</PROPERTYEDITHEADER>
        <PROPERTYEDITUNIT>Sec</PROPERTYEDITUNIT>
        <PROPERTYEDITHELP>Reply Timeout</PROPERTYEDITHELP>
      </ReplyTimeout>
      <ConnectionTimeout>
        <!--Connection Timout-->
        <PROPERTYTYPE>VT_U4</PROPERTYTYPE>
        <DEFAULTVALUE>2000</DEFAULTVALUE>
        <PROPERTYMIN>1000</PROPERTYMIN>
        <PROPERTYMAX>20000</PROPERTYMAX>
        <PROPERTYEDITHEADER>Connection Attempt Timeout</PROPERTYEDITHEADER>
        <PROPERTYEDITUNIT>MSec</PROPERTYEDITUNIT>
        <PROPERTYEDITHELP>Connection Attempt Timeout</PROPERTYEDITHELP>
      </ConnectionTimeout>
    </PROPERTYRULES>
  </HIERARCHYNODE>
  <HIERARCHYNODE TYPE="PYRAMID_EI" EDITORID="{4D9DE9D0-48BB-489E-9CED-5284FFA3EFED}" DELIMITER=".">
    <CHILDRULES>
      <PYRAMID_KA MAXOCCURRENCES="4"/>
      <PYRAMID_RM MAXOCCURRENCES="1"/>
      <PYRAMID_PLC5250 MAXOCCURRENCES="4"/>
    </CHILDRULES>
    <PROPERTYRULES>
      <HostName>
        <PROPERTYTYPE>VT_BSTR</PROPERTYTYPE>
        <DEFAULTVALUE>10.32.12.36</DEFAULTVALUE>
```

```xml
        <PROPERTYMIN>0</PROPERTYMIN>
        <PROPERTYMAX>255</PROPERTYMAX>
        <PROPERTYEDITHEADER>device IP address</PROPERTYEDITHEADER>
        <PROPERTYEDITUNIT/>
        <PROPERTYEDITHELP>Device IP Host Name/Address</PROPERTYEDITHELP>
      </HostName>
      <ConnectionTimeout>
        <!--Connection Timout-->
        <PROPERTYTYPE>VT_U4</PROPERTYTYPE>
        <DEFAULTVALUE>2000</DEFAULT VALUE>
        <PROPERTYMIN>1000</PROPERTYMIN>
        <PROPERTYMAX>20000</PROPERTYMAX>
        <PROPERTYEDITHEADER>Connection Attempt Timeout/PROPERTYEDITHEADER>
        <PROPERTYEDITUNIT>MSec</PROPERTYEDITUNIT>
        <PROPERTYEDITHELP>Connection Attempt Timeout</PROPERTYEDITHELP>
      </ConnectionTimeout>
    </PROPERTYRULES>
  </HIERARCHYNODE>
  <HIERARCHYNODE TYPE="PYRAMID_PLC5250" PACKAGEID="" EDITORID="{A7EBCF9D-9ECE-4DD5-B417-506ABA20855F}" DELIMITER=".">
    <CHILDRULES ENABLEDEVICEGROUPS="1"/>
    <PROPERTYRULES>
      <ReplyTimeout>
        <PROPERTYTYPE>VT_UI4</PROPERTYTYPE>
        <DEFAULTVALUE>15</DEFAULTVALUE>
        <PROPERTYMIN>1</PROPERTYMIN>
        <PROPERTYMAX>300</PROPERTYMAX>
        <PROPERTYEDITHEADER>ReplyTimeout/PROPERTYEDITHEADER>
        <PROPERTYEDITUNIT>Sec</PROPERTYEDITUNIT>
        <PROPERTYEDITHELP>Reply Timeout</PROPERTYEDITHELP>
      </ReplyTimeout>
      <DataBlockSize>
        <PROPERTYTYPE>VT_UI4</PROPERTYTYPE>
        <DEFAULTVALUE>2000</DEFAULT VALUE>
        <PROPERTYMIN>2</PROPERTYMIN>
        <PROPERTYMAX>2000</PROPERTYMAX>
        <PROPERTYEDITHEADER>Message packet size for PLC5 on Ethernet</PROPERTYEDITHEADER>
        <PROPERTYEDITUNIT/>
        <PROPERTYEDITHELP>Message packet size for PLC5 on Ethernet</PROPERTYEDITHELP>
      </DataBlockSize>
    </PROPERTYRULES>
  </HIERARCHYNODE>
  <HIERARCHYNODE TYPE="PYRAMID_RM" EDITORID="" DELIMITER=":">
    <CHILDRULES>
      <PORT_DHP MAXOCCURRENCES="2"/>
      <PORT_DH MAXOCCURRENCES="2"/>
    </CHILDRULES>
  </HIERARCHYNODE>
  <HIERARCHYNODE TYPE="PYRAMID_KA" EDITORID="{8A04DA4D-F6C0-4C1F-A771-806CDA40029F}" DELIMITER=".">
    <CHILDRULES>
      <PORT_DHP MAXOCCURRENCES="2"/>
      <PORT_DH MAXOCCURRENCES="2"/>
    </CHILDRULES>
    <PROPERTYRULES>
      <Pushwheel>
        <PROPERTYTYPE>VT_UI4</PROPERTYTYPE>
        <DEFAULT VALUE>1</DEFAULT VALUE>
        <PROPERTYMIN>1</PROPERTYMIN>
        <PROPERTYMAX>4</PROPERTYMAX>
        <PROPERTYEDITHEADER>Push Wheel</PROPERTYEDITHEADER>
        <PROPERTYEDITUNIT>
        <PROPERTYEDITHELP>Push Wheel</PROPERTYEDITHELP>
      </Pushwheel>
    </PROPERTYRULES>
  </HIERARCHYNODE>
  <HIERARCHYNODE TYPE="PORT_DHP" EDITORID="{2B22472C-2F98-4D1B-A211-7036FCBF9AA2}" PACKAGEID=""DELIMITER=".">
    <CHILDRULES>
      <PLC5_DHP MAXOCCURRENCES="100"/>
      <SLC500_DHP MAXOCCURRENCES="100"/>
      <PLC3_DHP MAXOCCURRENCES="100"/>
    </CHILDRULES>
    <PROPERTYRULES>
      <PortNumber>
        <!--Port Number-->
        <PROPERTYTYPE>VT_UI4</PROPERTYTYPE>
        <DEFAULT VALUE>2</DEFAULTVALUE>
        <PROPERTYMIN>2</PROPERTYMIN>
```

-continued

```
            <PROPERTYMAX>3</PROPERTYMAX>
            <PROPERTYEDITHEADER>Channel Number</PROPERTYEDITHEADER>
            <PROPERTYEDITUNIT/>
            <PROPERTYEDITHELP>Channel Number</PROPERTYEDITHELP>
        </PortNumber>
    </PROPERTYRULES>
</HIERARCHYNODE>
<HIERARCHYNODE TYPE="PORT_DH" PACKAGEID="" EDITORID="{67D79FDA-4DC4-43A2-9B24-5735C3E3B428}" DELIMITER=".">
    <CHILDRULES>
        <PLC2_DH MAXOCCURRENCES="100"/>
    </CHILDRULES>
    <PROPERTYRULES>
        <PortNumber>
            <!--Port Number-->
            <PROPERTYTYPE>VT_UI4</PROPERTYTYPE>
            <DEFAULTVALUE>2</DEFAULTVALUE>
            <PROPERTYMIN>2</PROPERTYMIN>
            <PROPERTYMAX>3</PROPERTYMAX>
            <PROPERTYEDITHEADER>Channel Number</PROPERTYEDITHEADER>
            <PROPERTYEDITUNIT/>
            <PROPERTYEDITHELP>Channel Number</PROPERTYEDITHELP>
        </PortNumber>
    </PROPERTYRULES>
</HIERARCHYNODE>
<HIERARCHYNODE TYPE="PLC5_DHP" EDITORID="{BF71A6EF-818F-4406-9038-60745B9A1538}" DELIMITER=".">
    <CHILDRULES ENABLEDEVICEGROUPS="1"/>
    <PROPERTYRULES>
        <NodeAddress>
            <PROPERTYTYPE>VT_UI4</PROPERTYTYPE>
            <DEFAULT VALUE>1</DEFAULT VALUE>
            <PROPERTYMIN>0</PROPERTYMIN>
            <PROPERTYMAX>63</PROPERTYMAX>
            <PROPERTYEDITHEADER>DH+ Node Nukmber</PROPERTYEDITHEADER>
            <PROPERTYEDITUNIT>Octal</PROPERTYEDITUNIT>
            <PROPERTYEDITHELP>Datahighway Plus Node Number</PROPERTYEDITHELP>
        </NodeAddress>
        <ReplyTimeout>
            <PROPERTYTYPE>VT_UI4</PROPERTYTYPE>
            <DEFAULTVALUE>15</DEFAULTVALUE>
            <PROPERTYMIN>1</PROPERTYMIN>
            <PROPERTYMAX>300</PROPERTYMAX>
            <PROPERTYEDITHEADER>ReplyTimeOut</PROPERTYEDITHEADER>
            <PROPERTYEDITUNIT>Sec</PROPERTYEDITUNIT>
            <PROPERTYEDITHELP>Reply TimeOut</PROPERTYEDITHELP>
        </ReplyTimeout>
        <DataBlockSize>
            <PROPERTYTYPE>VT_UI4</PROPERTYTYPE>
            <DEFAULTVALUE>240</DEFAULTVALUE>
            <PROPERTYMIN>2</PROPERTYMIN>
            <PROPERTYMAX>240</PROPERTYMAX>
            <PROPERTYEDITHEADER>Message packet size for PLC5 on Datahiway Plus</PROPERTYEDITHEADER>
            <PROPERTYEDITUNIT/>
            <PROPERTYEDITHELP>Message packet size for PLC5 on Datahiway Plus</PROPERTYEDITHELP>
        </DataBlockSize>
    </PROPERTYRULES>
</HIERARCHYNODE>
<HIERARCHYNODE TYPE="SLC500_DHP" EDITORID="{78FF43FC-EA3B-4B37-AFA9-D8D95CFB69A5}" DELIMITER=".">
    <CHILDRULES ENABLEDEVICEGROUPS="1"/>
    <PROPERTYRULES>
        <NodeAddress>
            <PROPERTYTYPE>VT_UI4</PROPERTYTYPE>
            <DEFAULTVALUE>1</DEFAULTVALUE>
            <PROPERTYMIN>0</PROPERTYMIN>
            <PROPERTYMAX>63<IPROPERTYMAX>
            <PROPERTYEDITHEADER>DH+ Node Nukmber</PROPERTYEDITHEADER>
            <PROPERTYEDITUNIT>Octal</PROPERTYEDITIUNIT>
            <PROPERTYEDITHELP>Datahighway Plus Node Number</PROPERTYEDITHELP>
        </NodeAddress>
        <ReplyTimeout>
            <PROPERTYTYPE>VT_UI4</PROPERTYTYPE>
            <DEFAULTVALUE>15</DEFAULTVALUE>
            <PROPERTYMIN>1</PROPERTYMIN>
            <PROPERTYMAX>300</PROPERTYMAX>
            <PROPERTYEDITHEADER>ReplyTimeout</PROPERTYEDITHEADER>
            <PROPERTYEDITUNIT>MSec</PROPERTYEDITUNIT>
```

```
            <PROPERTYEDITHELP>Reply Timeout</PROPERTYEDITHELP>
          </ReplyTimeout>
          <DataBlockSize>
            <PROPERTYTYPE>VT_UI4</PROPERTYTYPE>
            <DEFAULTVALUE>204</DEFAULTVALUE>
            <PROPERTYMIN>2</PROPERTYMIN>
            <PROPERTYMAX>204</PROPERTYMAX>
            <PROPERTYEDITHEADER>Message packet size for PLC5 on Datahiway Plus</PROPERTYEDITHEADER>
            <PROPERTYEDITUNIT/>
            <PROPERTYEDITHELP>Message packet size for PLCS on Datahiway Plus</PROPERTYEDITHELP>
          </DataBlockSize>
        </PROPERTYRULES>
    </HIERARCHYNODE>
    <HIERARCHYNODE TYPE="PLC3_DHP" EDITORID="{F59F96D7-FA1D-4C9F-91F3-FABC09E00683}" DELIMITER=".">
        <CHILDRULES ENABLEDEVICEGROUPS="1"/>
        <PROPERTYRULES>
          <NodeAddress>
            <PROPERTYTYPE>VT_UI4</PROPERTYTYPE>
            <DEFAULTVALUE>1</DEFAULTVALUE>
            <PROPERTYMIN>0</PROPERTYMIN>
            <PROPERTYMAX>63</PROPERTYMAX>
            <PROPERTYEDITHEADER>DH+ Node Nukmber</PROPERTYEDITHEADER>
            <PROPERTYEDITUNIT>Octal</PROPERTYEDITUNIT>
            <PROPERTYEDITHELP>Datahighway Plus Node Number</PROPERTYEDITHELP>
          </NodeAddress>
          <ReplyTimeout>
            <PROPERTYTYPE>VT_UI4</PROPERTYTYPE>
            <DEFAULTVALUE>15</DEFAULTVALUE>
            <PROPERTYMIN>1</PROPERTYMIN>
            <PROPERTYMAX>300</PROPERTYMAX>
            <PROPERTYEDITHEADER>ReplyTimeouts/PROPERTYEDITHEADER>
            <PROPERTYEDITUNIT>MSec</PROPERTYEDITUNIT>
            <PROPERTYEDITHELP>Reply Timeout</PROPERTYEDITHELP>
          </ReplyTimeout>
          <DataBlockSize>
            <PROPERTYTYPE>VT_UI4</PROPERTYTYPE>
            <DEFAULTVALUE>240</DEFAULTVALUE>
            <PROPERTYMIN>2</PROPERTYMIN>
            <PROPERTYMAX>240</PROPERTYMAX>
            <PROPERTYEDITHEADER>Message packet size for PLC5 on Datahiway Plus</PROPERTYEDITHEADER>
            <PROPERTYEDITUNIT/>
            <PROPERTYEDITHELP>Message packet size for PLC5 on Datahiway Plus</PROPERTYEDITHELP>
          </DataBlockSize>
        </PROPERTYRULES>
    </HIERARCHYNODE>
    <HIERARCHYNODE TYPE="PLC2_DH" EDITORID="9C53E368-C85A-44B1-8F7E-5EE6EE07DBED}" DELIMITER=".">
        <CHILDRULES ENABLEDEVICEGROUPS="1"/>
        <PROPERTYRULES>
          <NodeAddress>
            <PROPERTYTYPE>VT_UI4</PROPERTYTYPE>
            <DEFAULTVALUE>1</DEFAULT VALUE>
            <PROPERTYMIN>0</PROPERTYMIN>
            <PROPERTYMAX>255</PROPERTYMAX>
            <PROPERTYEDITHEADER>DH Node Nukmber</PROPERTYEDITHEADER>
            <PROPERTYEDITUNIT>Octal</PROPERTYEDITUNIT>
            <PROPERTYEDITHELP>Datahighway Node Number</PROPERTYEDITHELP>
          </NodeAddress>
          <ReplyTimeout>
            <PROPERTYTYPE>VT_UI4</PROPERTYTYPE>
            <DEFAULTVALUE>15</DEFAULTVALUE>
            <PROPERTYMIN>1</PROPERTYMIN>
            <PROPERTYMAX>300</PROPERTYMAX>
            <PROPERTYEDITHEADER>ReplyTimeout</PROPERTYEDITHEADER>
            <PROPERTYEDITUNIT>MSec</PROPERTYEDITUNIT>
            <PROPERTYEDITHELP>Reply Timeout</PROPERTYEDITHELP>
          </ReplyTimeout>
          <DataBlockSize>
            <PROPERTYTYPE>VT_UI4</PROPERTYTYPE>
            <DEFAULTVALUE>240</DEFAULTVALUE>
            <PROPERTYMIN>100</PROPERTYMIN>
            <PROPERTYMAX>240</PROPERTYMAX>
            <PROPERTYEDITHEADER>Message packet size for PLC5 on Datahiway Plus</PROPERTYEDITHEADER>
            <PROPERTYEDITUNIT/>
            <PROPERTYEDITHELP>Message packet size for PLC5 on Datahiway Plus</PROPERTYEDITHELP>
```

-continued

```
        </DataBlockSize>
      </PROPERTYRULES>
    </HIERARCHYNODE>
</CONFIGURATIONRULES>
```

The following is an example of the configuration file 280 which makes up a second part of a remote configuration 10 specification's persistence area.

| KEY | XML Attributes | Explanation |
|---|---|---|
| <DASConfiguration> | | Root key for the configuration (DAS related data is inside this root key only). The presence of this root key potentially allows additional (user-) data to be stored in the same file under parallel root keys. |
| <DeviceNode> | TYPE NAME DELIMITER | Key for a hierarchy level (related to a DAS object). TYPE (server specific class) and NAME are required - DELIMITER is optional (defaults to "." If not present) |
| <ItemHint> | TYPE NAME | Key for a pre-configured item or item hint. TYPE (server specific class) and NAME are required |
| <DeviceGroup> | TYPE NAME UPDATEINTERVAL | Key for an OPC access path/DDE/SL topic (related to device groups). NAME and UPDATEINTERVAL are required - TYPE (server specific class) is optional |
| <Data> | TYPE NAME | Key for DAServer global (user) settings. TYPE (server specific class) and NAME are required |
| <System> | | Key for DAServer global system settings. |

```
<?xml version="1.0" encoding="UTF-8"?>
<DASConfiguration NAME="Wonderware ABTCP (non-official)" DELIMITER=".">
    <!--Wonderware AB TCP/IP Server-->
    <created>03.29.2000 16:40</created>
    <user>Clement Lie</user>
    <DeviceNode TYPE="PORT_TCPIP" NAME="TCP" DELIMITER=".">
        <!--TCP/IP Port for ABTCP-->
        <MaxQueuedMsgs>3</MaxQueuedMsgs>
        <MaxSockets>200</MaxSockets>
        <MaxUnsolConn>20</MaxUnsolConn>
        <UnsolicitedMsgTimeout>5000</UnsolicitedMsgTimeout>
        <DeviceNode TYPE="PYRAMID_EI" NAME="EI" DELIMITER=".">
            <!--Ethernet Interface Module of Pyramid Integrator-->
            <HostName>P5250_1</HostName>
            <ConnectionTimeout>2000</ConnectionTimeout>
            <DeviceNode TYPE="PYRAMID_PLC5250" NAME="P5250_1" DELIMITER=".">
                <DataBlockSize>2000</DataBlockSize>
                <ReplyTimeout>15</ReplyTimeout>
                <DeviceGroup NAME="P5250_1_Fast" UPDATEINTERVAL="100"/>
                <DeviceGroup NAME="P5250_1" UPDATEINTERVAL="1000"/>
                <DeviceGroup NAME="P5250_1_Slow" UPDATEINTERVAL="5000"/>
            </DeviceNode>
            <DeviceNode TYPE="PYRAMID_RM" NAME="RM" DELIMITER=".">
                <DeviceNode TYPE="PORT_DHP" NAME="CH2" DELIMITER=".">
                    <PortNumber>2</PortNumber>
                    <DeviceNode TYPE="PLC5_DHP" NAME="P511_1" DELIMITER=".">
                        <NodeAddress>6</NodeAddress>
                        <DataBlockSize>240<DataBlockSize>
                        <ReplyTimeout>15</ReplyTimeout>
                        <DeviceGroup NAME="P511_1" UPDATEINTERVAL="1000"/>
                        <DeviceGroup NAME="P511_1_Fast" UPDATEINTERVAL="100"/>
                        <DeviceGroup NAME="P511_1_Slow" UPDATEINTERVAL="5000"/>
                    </DeviceNode>
                </DeviceNode>
                <DeviceNode TYPE="PORT_DHP" NAME="CH3" DELIMITER=".">
                    <PortNumber>3</PortNumber>
                    <DeviceNode NAME="SLC504_2" TYPE="SLC500_DHP" DELIMITER=".">
                        <NodeAddress>24</NodeAddress>
                        <ReplyTimeout>15</ReplyTimeout>
                        <DataBlockSize>204</DataBlockSize>
                    </DeviceNode>
                    <DeviceNode NAME="P520E_2" TYPE="PLC5_DHP" DELIMITER=".">
                        <NodeAddress>7</NodeAddress>
```

```xml
            <ReplyTimeout>15</ReplyTimeout>
            <DataBlockSize>240</DataBlockSize>
          </DeviceNode>
        </DeviceNode>
      </DeviceNode>
      <DeviceNode TYPE="PYRAMID_KA" NAME="KA" DELIMITER=".">
        <Pushwheel>1</Pushwheel>
        <DeviceNode TYPE="PORT_DHP" NAME="CH2" DELIMITER=".">
          <PortNumber>2</PortNumber>
          <DeviceNode TYPE="PLC3_DHP" NAME="P310_1" DELIMITER=".">
            <NodeAddress>9</NodeAddress>
            <DataBlockSize>240</DataBlockSize>
            <ReplyTimeout>15</ReplyTimeout>
            <DeviceGroup NAME="PLC3" UPDATEINTERVAL="1000"/>
            <DeviceGroup NAME="PLC3_Fast" UPDATEINTERVAL="100"/>
            <DeviceGroup NAME="PLC3_Slow" UPDATEINTERVAL="5000"/>
          </DeviceNode>
          <DeviceNode NAME="P520C_1" TYPE="PLC5_DHP" DELIMITER=".">
            <NodeAddress>52</NodeAddress>
            <ReplyTimeout>15</ReplyTimeout>
            <DataBlockSize>240</DataBlockSize>
          </DeviceNode>
          <DeviceNode NAME="P580E_1" TYPE="PLC5_DHP" DELIMITER=".">
            <NodeAddress>5</NodeAddress>
            <ReplyTimeout>15</ReplyTimeout>
            <DataBlockSize>240</DataBlockSize>
          </DeviceNode>
          <DeviceNode NAME="P520E_2" TYPE="PLC5_DHP" DELIMITER=".">
            <NodeAddress>7</NodeAddress>
            <ReplyTimeout>15</ReplyTimeout>
            <DataBlockSize>240</DataBlockSize>
          </DeviceNode>
        </DeviceNode>
        <DeviceNode TYPE="PORT_DH" NAME="CH3" DELIMITER=".">
          <PortNumber>2</PortNumber>
          <DeviceNode TYPE="PLC2_DH" NAME="P216_1" DELIMITER =".">
            <NodeAddress>83</NodeAddress>
            <DataBlockSize>100</DataBlockSize>
            <ReplyTimeout>15</ReplyTimeout>
          </DeviceNode>
        </DeviceNode>
      </DeviceNode>
    </DeviceNode>
    <DeviceNode TYPE="PLC5_TCPIP" NAME="P520E_2" DELIMITER=".">
      <!--PLC5 on TCP/IP-->
      <HostName>P520E_2</HostName>
      <ReplyTimeout>300</ReplyTimeout>
      <DataBlockSize>1000</DataBlockSize>
      <SupportsPID>1</SupportsPID>
      <UnsolClientMsg>1</UnsolClientMsg>
      <ConnectionTimeout>2000</ConnectionTimeout>
      <DeviceGroup NAME="P520E_2" UPDATEINTERVAL="1000"/>
      <DeviceGroup NAME="P520E_2_Slow" UPDATEINTERVAL="5000"/>
      <DeviceGroup NAME="P520E_2_Fast" UPDATEINTERVAL="100"/>
      <DeviceGroup NAME="P520E_2Unsol" UPDATEINTERVAL="10000000000"/>
    </DeviceNode>
    <DeviceNode TYPE="SLC500_TCPIP" NAME="SLC505_2" DELIMITER=".">
      <HostName>SLC505_2</HostName>
      <ReplyTimeout>10</ReplyTimeout>
      <DataBlockSize>510<DataBlockSize>
      <ConnectionTimeout>2000</ConnectionTimeout>
      <DeviceGroup NAME="SLC505_1_Fast" UPDATEINTERVAL="100"/>
      <DeviceGroup NAME="SLC505_1" UPDATEINTERVAL="1000"/>
      <DeviceGroup NAME="SLC505_1_Slow" UPDATEINTERVAL="5000"/>
    </DeviceNode>
    <DeviceNode NAME="MyPLC5" TYPE="PLC5_TCPIP" DELIMITER=".">
      <HostName>10.32.12.36</HostName>
      <DataBlockSize>2000</DataBlockSize>
      <ReplyTimeout>3</ReplyTimeout>
      <SupportsPID>1</SupportsPID>
      <UnsolClientMsg>1</UnsolClientMsg>
      <ConnectionTimeout>2000</ConnectionTimeout>
      <DeviceGroup NAME="Fast PLC5" TYPE="Topic" UPDATEINTERVAL="20"/>
      <DeviceGroup NAME="Medium PLC5" TYPE ="Topic" UPDATEINTERVAL="1000"/>
      <DeviceGroup NAME="Slow PLCS" TYPE="Topic" UPDATEINTERVAL="10000"/>
      <DeviceItem TYPE="" NAME="N7:0"/>
      <DeviceItem TYPE="" NAME="N7:2"/>
      <DeviceItem TYPE="" NAME="N7:3"/>
      <DeviceItem TYPE="" NAME="N7:11"/>
```

-continued

```
        <DeviceItem TYPE="" NAME="N7:14"/>
        <DeviceItem TYPE="" NAME="N17:0"/>
        <DeviceItem TYPE="" NAME="N17:1"/>
        <DeviceItem TYPE="" NAME="N17:2"/>
        <DeviceItem TYPE="" NAME="N17:3"/>
        <DeviceItem TYPE="" NAME="N17:50"/>
        <DeviceItem TYPE="" NAME="N17:99"/>
        <DeviceItem TYPE="" NAME="N27:0"/>
        <DeviceItem TYPE="" NAME="N27:1"/>
        <DeviceItem TYPE="" NAME="N27:2"/>
        <DeviceItem TYPE="" NAMF="N27:3"/>
        <DeviceItem TYPE="" NAME="N27:50"/>
        <DeviceItem TYPE="" NAME="N27:99"/>
        <DeviceItem TYPE="" NAME="B3:0/8"/>
        <DeviceItem TYPE="" NAME="B13:0/180"/>
        <DeviceItem TYPE="" NAME="A9:0-8"/>
        <DeviceItem TYPE="" NAME="F8:2"/>
        <DeviceItem TYPE="" NAME="F8:12"/>
        <DeviceItem TYPE="" NAME="ST10:0"/>
    </DeviceNode>
    <DeviceNode NAME="MyPLC37" TYPE="PLC5_TCPIP" DELIMITER=".">
        <HostName>10.32.12.37</HostName>
        <DataBlockSize>2000</DataBlockSize>
        <ReplyTimeout>3</ReplyTimeout>
        <SupportsPID>1</SupportsPID>
        <UnsolClientMsg>1</UnsolClientMsg>
        <ConnectionTimeout>2000</ConnectionTimeout>
        <DeviceGroup NAME="Fast PLC37" TYPE="Topic" UPDATEINTERVAL="20"/>
        <DeviceGroup NAME="Medium PLC37" TYPE="Topic" UPDATEINTERVAL="1000"/>
        <DeviceGroup NAME="Slow PLC37" TYPE="Topic" UPDATEINTERVAL="10000"/>
        <ItemHint TYPE="" NAME="N7:0-4"/>
        <ItemHint TYPE="" NAME="F8:0-3"/>
        <ItemHint TYPE="" NAME="BT9:0-3"/>
        <ItemHint TYPE="" NAME="N10:0-74"/>
        <ItemHint TYPE="" NAME="B11:0-0"/>
        <ItemHint TYPE="" NAME="PD12:0-0"/>
        <ItemHint TYPE="" NAME="N13:0-3"/>
        <ItemHint TYPE="" NAME="N14:0-4"/>
        <ItemHint TYPE="" NAME="N15:0-4"/>
    </DeviceNode>
</DeviceNode>
<System NAME="SYSTEM" TYPE="SYSTEM">
    <UpdateInterval>1000</UpdateInterval>
    <SlowPollInterval>10000</SlowPollInterval>
    <CaseSensitive>0</CaseSensitive>
    <DefaultPokeMode>0</DefaultPokeMode>
    <DefaultDelimiter>."</DefaultDelimiter>
    <SimulationMode>0</SimulationMode>
    <EnableSystemItems>1</Enable SystemItems>
    <LinkTopicCache>0<LinkTopicCache>
    <UniqueDeviceGroup>1</UniqueDeviceGroup>
    <ProtocolTimerTick>60</ProtocolTimerTick>
    <TransactionTimeout>2000</TransactionTimeout>
    <LockConfigurationFile>0</LockConfigurationFile>
    <SubscriptionTransactionRatio>2</SubscriptionTransactionRatio>
</System>
</DASConfiguration>
```

Illustrative embodiments of the present invention and certain variations thereof have been provided in the Figures and accompanying written description. The present invention is not intended to be limited to these embodiments. Rather the present invention is intended to cover the disclosed embodiments as well as others falling within the scope and spirit of the invention to the fullest extent permitted in view of this disclosure and the inventions defined by the claims appended herein below.

What is claimed is:

1. A distributed configuration utility facilitating remote configuration of process control data access servers, the distributed configuration utility comprising:

a configuration editor located at a configuration console;

a configuration storage for storing information including parameter values corresponding to a current configuration of a configurable process control data access server;

a rules storage for storing a set of configuration rules associated with the configurable process control data access server, wherein the set of configuration rules provide a guide to processing the configuration information within the configuration storage corresponding to the current configuration of the configurable process control data access server; and a server agent, located on a computing node remote from the configuration console and containing the configurable process control data access server, the server agent including executable procedures for notifying the configuration editor of the configurable process control data access server and thereby facilitating establishing a configuration interface between the configuration editor and the configurable process control data access server.

2. The distributed configuration utility of claim 1 wherein the set of configuration rules specify configuration hierarchy levels.

3. The distributed configuration utility of claim 2 wherein the set of configuration rules specify properties associated with particular ones of configuration nodes of the configuration hierarchy levels.

4. The distributed configuration utility of claim 1 further comprising an executable notification mechanism that establishes a connection to an active data access server having changed configuration parameter values, and notifies the active data access server of the change to its configuration.

5. The distributed configuration utility of claim 1 further comprising a user editor host providing an interface supporting editor interface faceplates specified for particular component types of a process control data access server configuration.

6. The distributed configuration utility of claim 1 wherein the configuration storage and rules storage are maintained on the computing node upon which the configurable process control data access server resides.

7. The distributed configuration utility of claim 1 wherein the configuration storage comprises a standard interface that exposes methods for accessing configuration information from a variety of forms in which the configuration information is potentially stored.

8. The distributed configuration utility of claim 1 wherein the server agent supports notification of the configuration editor with regard to multiple data access servers residing on the computing node.

9. The distributed configuration utility of claim 1 wherein the configuration editor resides upon a computing node at a supervisory level of a process control system.

10. A method for remotely configuring a data access server in a system including a configuration editor and a configurable process control data access server and a server agent located remotely from the configuration editor on a computing node, the server agent being capable of identifying process control data access servers currently residing on the computing node, the method comprising the steps of:
   receiving, by the configuration editor from the server agent, a notification regarding data access servers presently residing on the computing node, including the configurable process control data access server;
   obtaining, by the configuration editor after receiving the notification, configuration information relating to the configurable process control data access server, the configuration information including:
      a configuration data set comprising data access server parameter values, and
      a rules data set comprising rules that guide processing the configuration data set; and
   providing access, by the configuration editor, to the configuration data set in accordance with the rules of the rules data set.

11. The method of claim 10 further comprising the step of:
   requesting, from the server agent, identification of process control data access servers presently residing on the computing node.

12. The method of claim 10 further comprising the step of:
   modifying, by the configuration editor, the configuration information relating to the configurable process control data access server.

13. The method of claim 12 wherein the modifying step comprises changing an existing parameter value within the configuration data set.

14. The method of claim 12 wherein the configuration information for the configurable process control data access server comprises a configuration hierarchy including nodes associated with levels of the configuration hierarchy, and the modifying step comprises adding a new node to the configuration hierarchy.

15. The method of claim 14 wherein the rules data set includes a rule specifying one or more node types that can be added under a currently selected node of the configuration hierarchy for the configurable process control data access server.

16. The method of claim 12 further comprising the step of:
   storing, at the computing node, a change to the configuration information arising from the modifying step.

17. A computer-readable medium including computer-executable instructions facilitating remotely configuring a data access server in a system including a configuration editor and a configurable process control data access server and a server agent located remotely from the configuration editor on a computing node, the server agent being capable of identifying process control data access servers currently residing on the computing node, the computer-executable instructions facilitating performing the steps of:
   receiving, by the configuration editor from the server agent, a notification regarding data access servers presently residing on the computing node, including the configurable process control data access server;
   obtaining, by the configuration editor after receiving the notification, configuration information relating to the configurable process control data access server, the configuration information including:
      a configuration data set comprising data access server parameter values, and
      a rules data set comprising rules that guide processing the configuration data set; and
   providing access, by the configuration editor, to the configuration data set in accordance with the rules of the rules data set.

18. The computer-readable medium of claim 17 further comprising computer-executable instructions facilitating performing the step of:
   requesting, from the server agent, identification of process control data access servers presently residing on the computing node.

19. The computer-readable medium of claim 17 further comprising computer-executable instructions facilitating performing the step of:
   modifying, by the configuration editor, the configuration information relating to the configurable process control data access server.

20. The computer-readable medium of claim 19 wherein the configuration information for the configurable process control data access server comprises a configuration hierarchy including nodes associated with levels of the configuration hierarchy, and the modifying step comprises adding a new node to the configuration hierarchy.

* * * * *